US012560794B2

(12) United States Patent
Chang et al.

(10) Patent No.: US 12,560,794 B2
(45) Date of Patent: Feb. 24, 2026

(54) MICROSCOPIC OBSERVATION METHOD AND MICROSCOPIC OBSERVATION DEVICE

(71) Applicant: INDUSTRIAL TECHNOLOGY RESEARCH INSTITUTE, Hsinchu (TW)

(72) Inventors: Sheng-Li Chang, Zhubei (TW); Chi Shen Chang, Zhubei (TW); Chih-Cheng Hsu, Miaoli County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 872 days.

(21) Appl. No.: 17/731,182

(22) Filed: Apr. 27, 2022

(65) Prior Publication Data

US 2023/0350181 A1     Nov. 2, 2023

(51) Int. Cl.
*G02B 21/12*       (2006.01)
*G02B 21/34*       (2006.01)
*G06V 20/69*       (2022.01)

(52) U.S. Cl.
CPC .......... *G02B 21/125* (2013.01); *G02B 21/34* (2013.01); *G06V 20/69* (2022.01)

(58) Field of Classification Search
CPC .............................................. G02B 21/00–368
USPC .................................................. 359/368–398
See application file for complete search history.

(56) References Cited

U.S. PATENT DOCUMENTS

| | | | |
|---|---|---|---|
| 6,373,626 B1 * | 4/2002 | Tanaka ................. | G02B 21/125 |
| | | | 359/368 |
| 7,799,559 B2 | 9/2010 | Hasegawa et al. | |
| 9,075,235 B2 | 7/2015 | Rassier et al. | |
| 10,267,745 B2 | 4/2019 | Otani et al. | |
| 10,545,096 B1 | 1/2020 | Putman et al. | |
| 2011/0069313 A1 | 3/2011 | Sakai et al. | |

(Continued)

FOREIGN PATENT DOCUMENTS

| | | |
|---|---|---|
| CN | 102037348 A | 4/2011 |
| CN | 102540445 A | 7/2012 |
| CN | 104568886 A | 4/2015 |

(Continued)

OTHER PUBLICATIONS

TW Office Action in Application No. 111116052 Dated Nov. 2, 2022.

*Primary Examiner* — Jessica M Merlin
(74) *Attorney, Agent, or Firm* — Maschoff Brennan

(57)     ABSTRACT
A microscopic observation method configured to observe a specimen in a specimen carrier that includes the following steps: placing the specimen carrier at an observation point; obtaining a length of the specimen carrier along a movement direction, a thickness of the specimen carrier along an observation direction of a microscope objective, an observation angle of the microscope objective, and a relative distance between a lateral surface of the specimen carrier and the microscope objective along the movement direction; and adjusting an incident angle of a light beam emitted from a dark-field illumination towards the specimen carrier according to a calculation result of the length, the thickness, the observation angle, and the relative distance.

15 Claims, 17 Drawing Sheets
(2 of 17 Drawing Sheet(s) Filed in Color)

10

(56)                    References Cited

U.S. PATENT DOCUMENTS

2012/0140055  A1      6/2012   Narusawa et al.

FOREIGN PATENT DOCUMENTS

| | | | | |
|---|---|---|---|---|
| CN | 105524833 | A | 4/2016 | |
| CN | 105785560 | A | 7/2016 | |
| CN | 109790502 | A | 5/2019 | |
| CN | 111929886 | A | 11/2020 | |
| CN | 110987817 | B | 1/2021 | |
| JP | 6793656 | B2 | 11/2020 | |
| TW | M362998 | U1 | 8/2009 | |
| TW | 202037901 | A | 10/2020 | |
| TW | 202123168 | A | 6/2021 | |
| WO | WO-2004019108 | A1 * | 3/2004 | ........... G02B 21/125 |

* cited by examiner

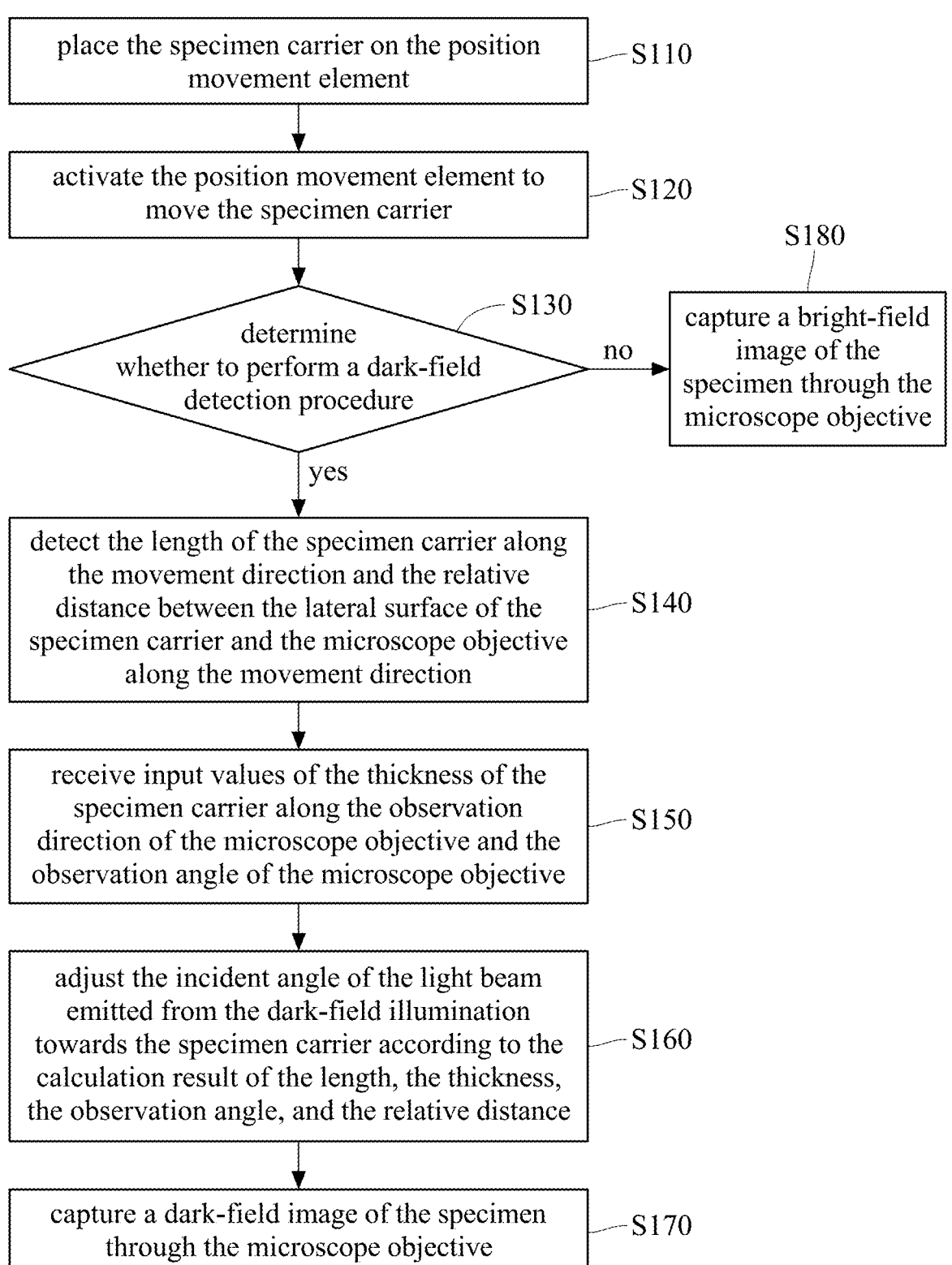

place the specimen carrier on the position movement element — S110 activate the position movement element to move the specimen carrier — S120 determine whether to perform a dark-field detection procedure — S130 no → capture a bright-field image of the specimen through the microscope objective — S180 yes detect the length of the specimen carrier along the movement direction and the relative distance between the lateral surface of the specimen carrier and the microscope objective along the movement direction — S140 receive input values of the thickness of the specimen carrier along the observation direction of the microscope objective and the observation angle of the microscope objective — S150 adjust the incident angle of the light beam emitted from the dark-field illumination towards the specimen carrier according to the calculation result of the length, the thickness, the observation angle, and the relative distance — S160 capture a dark-field image of the specimen through the microscope objective — S170

FIG. 3

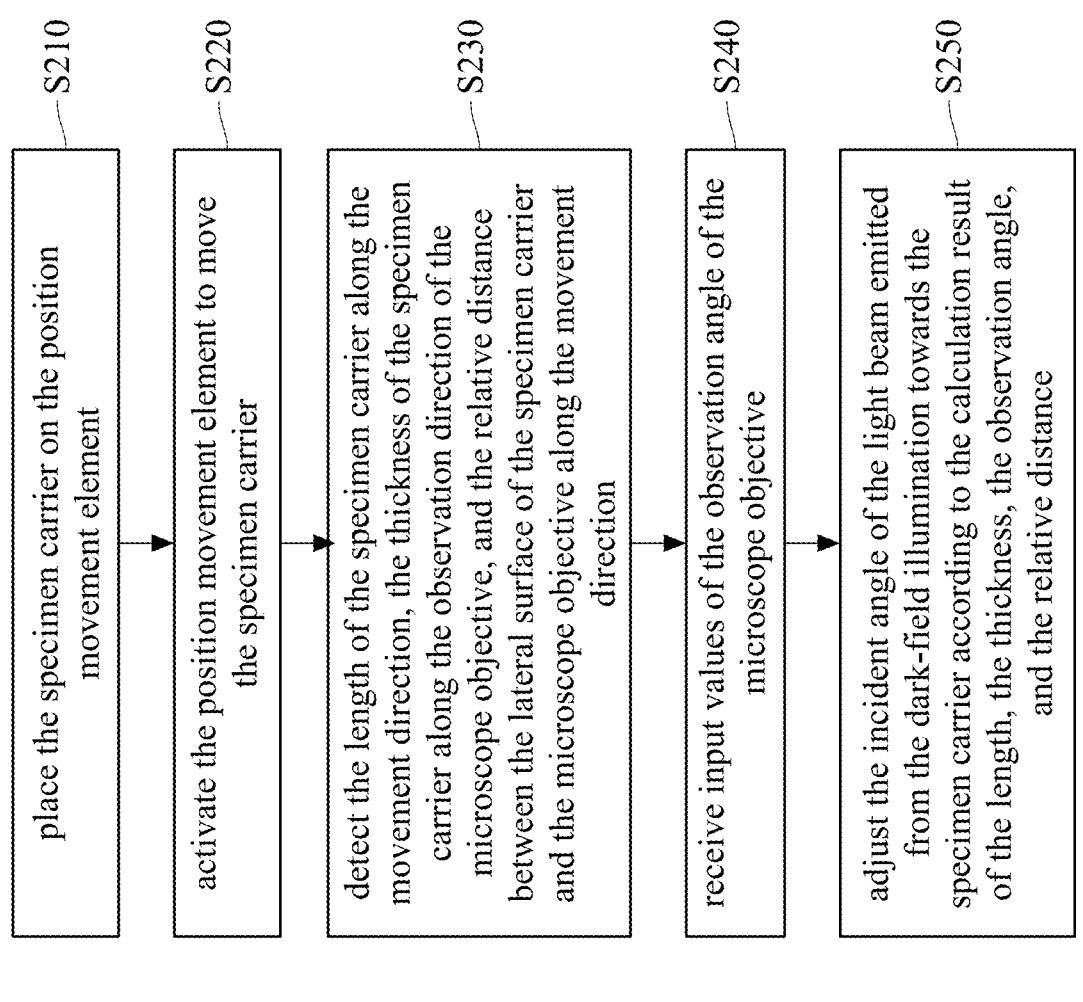

S210 place the specimen carrier on the position movement element

S220 activate the position movement element to move the specimen carrier

S230 detect the length of the specimen carrier along the movement direction, the thickness of the specimen carrier along the observation direction of the microscope objective, and the relative distance between the lateral surface of the specimen carrier and the microscope objective along the movement direction

S240 receive input values of the observation angle of the microscope objective

S250 adjust the incident angle of the light beam emitted from the dark-field illumination towards the specimen carrier according to the calculation result of the length, the thickness, the observation angle, and the relative distance

FIG. 16

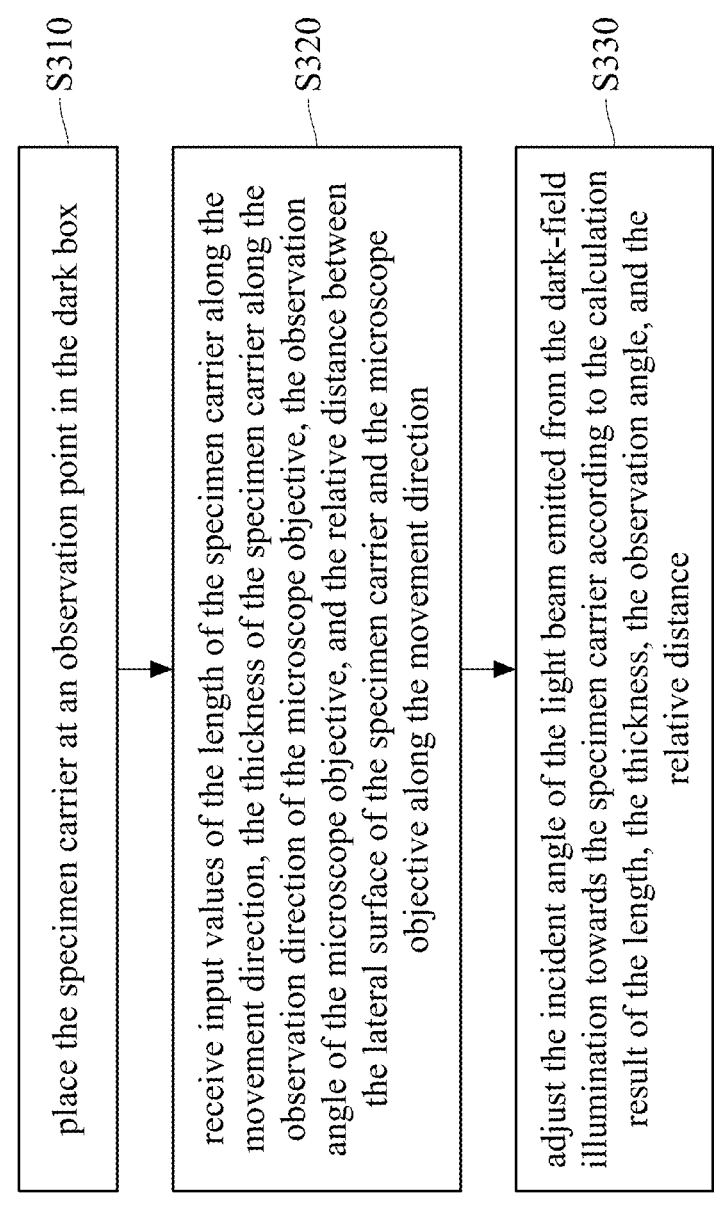

place the specimen carrier at an observation point in the dark box — S310 receive input values of the length of the specimen carrier along the movement direction, the thickness of the specimen carrier along the observation direction of the microscope objective, the observation angle of the microscope objective, and the relative distance between the lateral surface of the specimen carrier and the microscope objective along the movement direction — S320 adjust the incident angle of the light beam emitted from the dark-field illumination towards the specimen carrier according to the calculation result of the length, the thickness, the observation angle, and the relative distance — S330

FIG. 19

MICROSCOPIC OBSERVATION METHOD AND MICROSCOPIC OBSERVATION DEVICE

TECHNICAL FIELD

The present disclosure relates to a microscopic observation method and a microscopic observation device, more particularly to a microscopic observation method and a microscopic observation device which are capable of adjusting a dark-field illumination.

BACKGROUND

With the development of the emerging cell therapy industry, traditional manual cell culture is moving towards the goal of "automation cell mass production". Due to the space and control requirements of the automation equipment for cell mass production, it is difficult to integrate commercially available microscope systems. Therefore, it is necessary to specifically develop a special microscopic imaging and analysis system.

However, it is difficult for the current automation cell mass production device to obtain a proper balance between automation convenience and image monitoring quality. In detail, the image monitoring refers to bright-field image capturing and dark-field image capturing. In microscopy, a bright-field image is suitable for cell detail observation, while a dark-field image is suitable for a cell nucleus contour observation without cell staining. Bright-field and dark-field images can complement each other to increase the accuracy of image analysis. However, in dark-field image capturing, the quality of dark-field images is often lowered due to the interference of secondary illumination caused by improper design of the dark-field illumination. Therefore, how to make the automation cell mass production device capable of obtaining a proper balance between automation convenience and image monitoring quality is one of the goals worth to be pursued by the researchers.

SUMMARY

According to one aspect of the present disclosure, a microscopic observation method configured to observe a specimen in a specimen carrier includes the following steps: placing the specimen carrier at an observation point; obtaining a length of the specimen carrier along a movement direction, a thickness of the specimen carrier along an observation direction of a microscope objective, an observation angle of the microscope objective, and a relative distance between a lateral surface of the specimen carrier and the microscope objective along the movement direction; and adjusting an incident angle of a light beam emitted from a dark-field illumination towards the specimen carrier according to a calculation result of the length, the thickness, the observation angle, and the relative distance.

According to another aspect of the present disclosure, a microscopic observation device configured to observe a specimen in a specimen carrier includes a dark box, a microscope objective, a position movement element, a dark-field illumination, and a controller. The dark box has an accommodation space configured for accommodating the specimen carrier. The microscope objective is disposed out of the accommodation space of the dark box, and the microscope objective has an observation area and an observation angle. The position movement element is movably disposed in the accommodation space of the dark box, and the position movement element includes two holders configured to clamp the specimen carrier and move the specimen carrier to the observation area. The dark-field illumination is movably disposed in the dark box and configured for adjusting an incident angle of a light beam emitted from a dark-field illumination towards the microscope objective. The controller is electrically connected to the microscope objective, the position movement element, and the dark-field illumination, the controller is configured to instruct the dark-field illumination to move according to a calculation result of a clamping distance of the holders, a thickness of the specimen carrier, the observation angle, and a relative distance between one of the holders located away from the dark-field illumination and the microscope objective, and the controller is configured to obtain an image of the specimen in the specimen carrier through the microscope objective.

The aforementioned summary and the following detailed description are set forth in order to provide a thorough understanding of the disclosed embodiment and provide a further explanations of claims of the disclosure.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

FIG. 3 is a flow chart of a method of observing the specimen carrier by the microscopic observation device in FIG. 1;

FIG. 16 is a flow chart of a method of observing the specimen carrier by the microscopic observation device in FIG. 15;

FIG. 19 is a flow chart of a method of observing the specimen carrier by the microscopic observation device in FIG. 17.

DETAILED DESCRIPTION

The present disclosure provides a microscopic observation method and a microscopic observation device which are capable of making an automation cell mass production device feature automation convenience and quality image monitoring.

Figure 1:
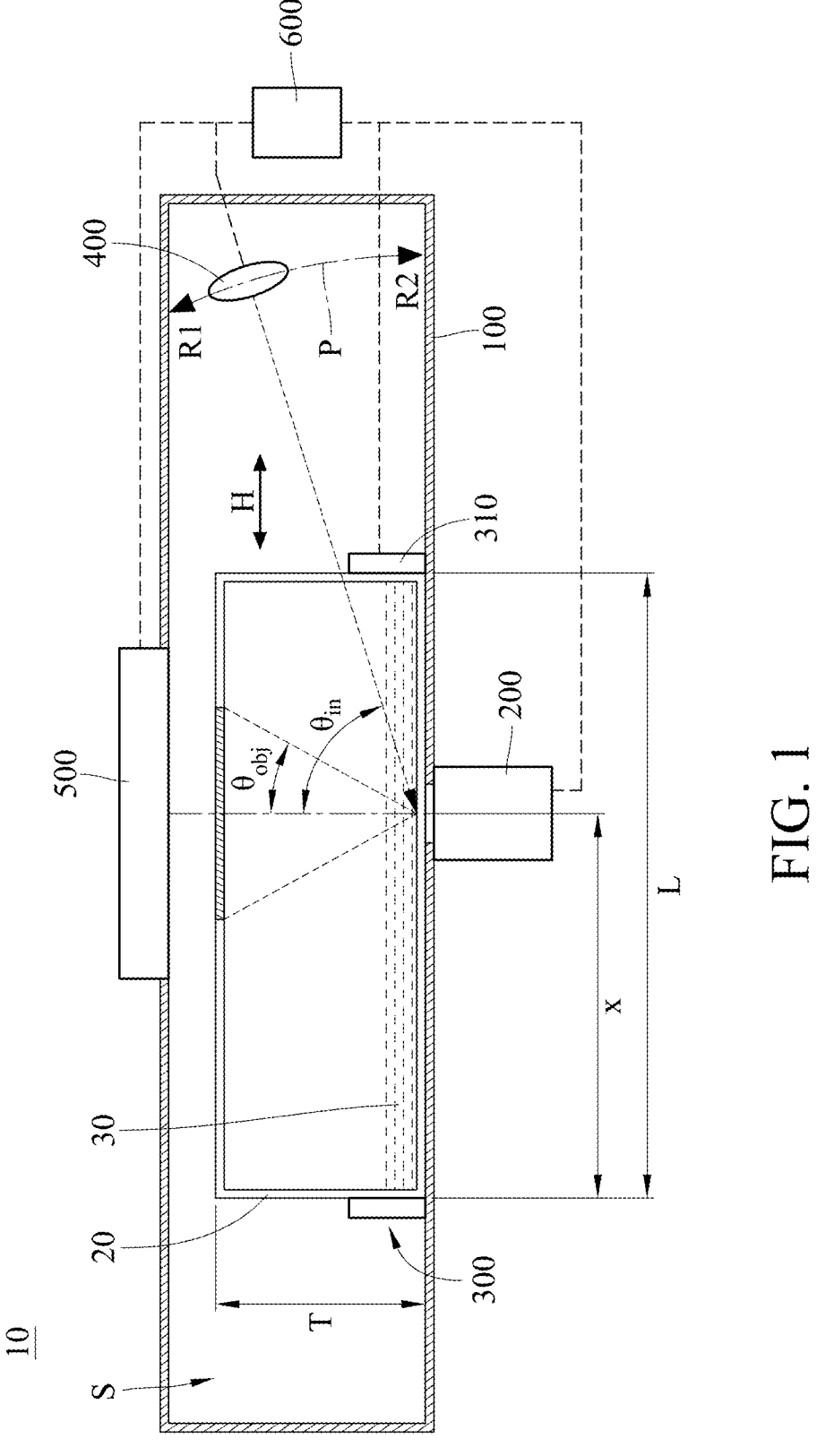
FIG. 1 is a schematic side view of a microscopic observation device according to a first embodiment of the present disclosure.
Figure 2:
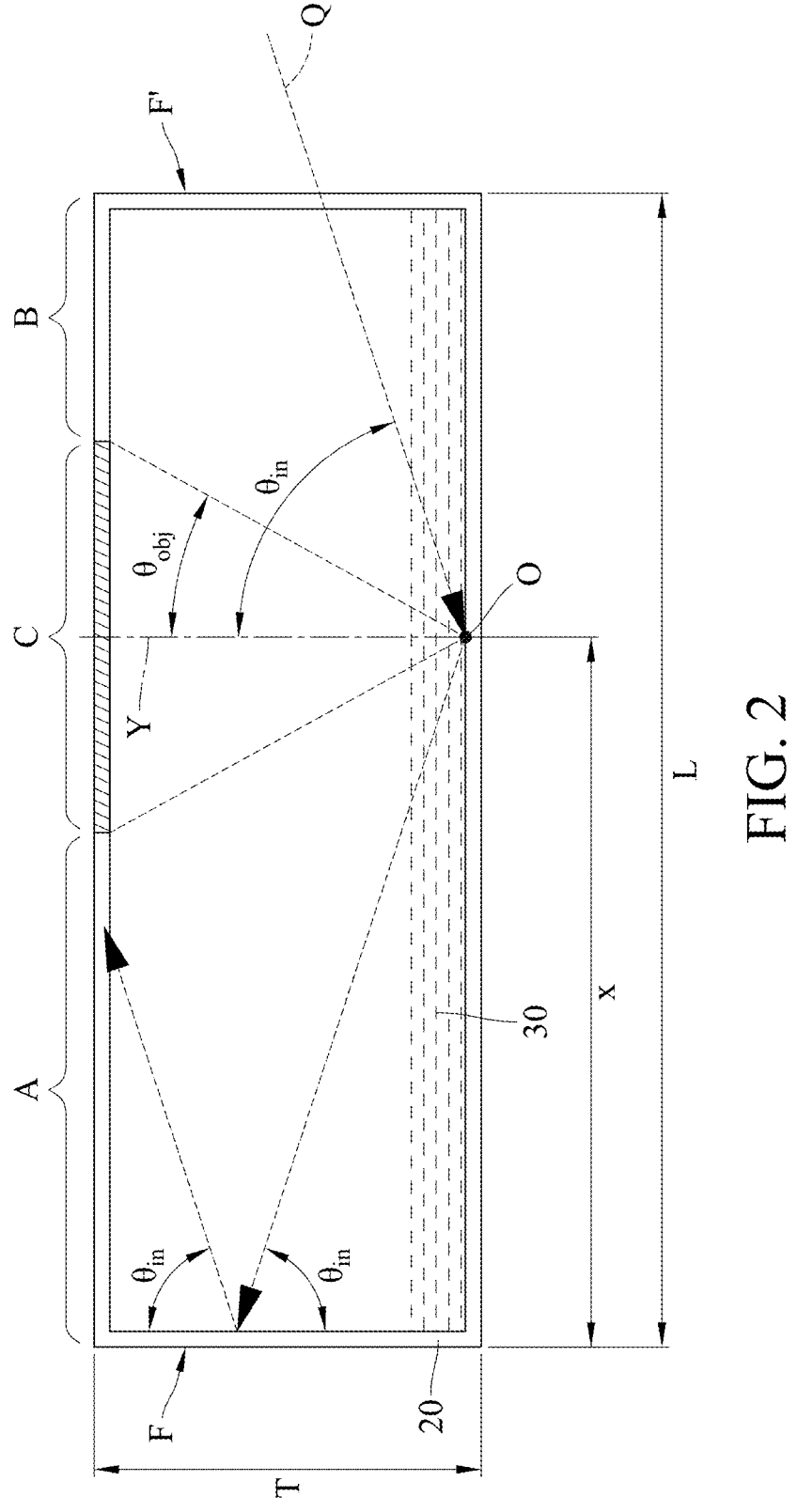
FIG. 2 is a schematic side view of a specimen carrier in the microscopic observation device in FIG. 1 illuminated by a dark-field illumination.

Please refer to FIG. 1 and FIG. 2 together, where FIG. 1 is a schematic side view of a microscopic observation device 10 according to a first embodiment of the present disclosure, and FIG. 2 is a schematic side view of a specimen carrier 20 in the microscopic observation device in FIG. 1 illuminated by a dark-field illumination 400.

A microscopic observation device 10 of this embodiment is suitable for observing a specimen 30 to be observed in a specimen carrier 20. The specimen carrier 20 may be a piece of glassware and has a vertical lateral surface F. The specimen 30 may be a cell or a biomaterial used for cell structure observation or biomaterial observation. The microscopic observation device 10 includes a dark box 100, a microscope objective 200, a position movement element 300, a dark-field illumination 400, a bright-field illumination 500, and a controller 600. The dark box 100 has an accommodation space S and is suitable for preventing external light from entering the accommodation space S of the dark box 100. The specimen carrier 20 can be accommodated in the accommodation space S of the dark box 100. The microscope objective 200 is disposed out of the accommodation space S of the dark box 100. The microscopic observation device 10 may adopt a plurality of microscope objectives 200 with different magnifications; in such a case, the microscope objectives 200 each have an observation area C (i.e., the visual field) and an observation angle $\theta_{obj}$, and one of the microscope objectives 200 is selectively to be aligned with the specimen carrier 20 so as to make the specimen 30 in the specimen carrier 20 to be located within the observation area C of the selected microscope objective 200.

The position movement element 300 is movably disposed in the dark box 100. The position movement element 300 includes, for example, two holders 310. The holders 310 are suitable for clamping the specimen carrier 20 and moving the specimen carrier 20 to the observation area C. Optionally, in one embodiment, a length L of the specimen carrier 20 is obtained by the holders 310 clamping the specimen carrier 20. The dark-field illumination 400 is movably disposed in the dark box 100 so as to adjust an incident angle of a light beam Q emitted from the dark-field illumination 400 towards the microscope objective 200. In this embodiment, the dark-field illumination 400 is movable on a movement path P along directions R1 and R2. The movement path P of the dark-field illumination 400 may be an arc line whose center point being an intersection point O of a central axis Y of the microscope objective 200 and the specimen carrier 20. The bright-field illumination 500 is disposed on the dark box 100, and the bright-field illumination 500 and the microscope objective 200 are respectively located at two opposite sides of the dark box 100. The controller 600 is electrically connected to the microscope objective 200, the position movement element 300, the dark-field illumination 400, and the bright-field illumination 500. The controller 600 instructs the dark-field illumination 400 to move according to a calculation result of the length L of the specimen carrier 20 (i.e., the distance between the holders 310 when clamping the specimen carrier 20), a thickness T of the specimen carrier 20 along an observation direction of the microscope objective 200, the observation angle $\theta_{obj}$, and a relative distance x between the lateral surface F of the specimen carrier 20 and the microscope objective 200, and the controller 600 is able to obtain images of the specimen 30 through the microscope objective 200.

In order to improve the quality of dark-field images of the specimen 30, the controller 600 will instruct the dark-field illumination 400 to move according to the calculation result of the length L of the specimen carrier 20, the thickness T of the specimen carrier 20 along the observation direction of the microscope objective 200, the observation angle $\theta_{obj}$, and the relative distance x between the lateral surface F of the specimen carrier 20 and the microscope objective 200. The specific parameters related to the moving of the dark-field illumination 400 can be comprehended with reference to FIG. 2. As shown, "$\theta_{in}$" denotes to an angle between the light beam Q emitted from the dark-field illumination 400 and the observation direction of the microscope objective 200 (in parallel with the central axis Y of the microscope objective 200), "$\theta_{obj}$" denotes to the observation angle of the microscope objective 200 (i.e., a maximum angle between the central axis Y of the microscope objective 200 and the boundary of the observation area C), "L" denotes to the length of the specimen carrier 20 along a movement direction H of the specimen carrier 20, "x" denotes to the relative distance along the movement direction H between an end of the position movement element 300 located away from the dark-field illumination 400 along the movement direction H (it can be considered as the lateral surface F of the specimen carrier 20) and the observation direction of the microscope objective 200, "T" denotes to the thickness of the specimen carrier 20 along the observation direction of the microscope objective 200, and the following formulas (1) to (4) are constituted by the abovementioned parameters. With the restrictions of the formulas (1) to (4), the secondary reflection of the light beam Q coming from the dark-field illumination 400 occurring at the lateral surface F of the specimen carrier 20 is prevented from emitting towards the observation area C. That is, the secondarily reflected light coming from the dark-field illumination 400 will only illuminate an area A or B other than the observation area C.

$$\theta_{in} \geq \tan^{-1} \frac{L-x}{T} \tag{1}$$

$$\theta_{in} \leq \tan^{-1} \frac{2x - T \tan \theta_{obj}}{T} \tag{2}$$

5

-continued $$\theta_{in} \geq \tan^{-1} \frac{2x + T \tan \theta_{obj}}{T} \qquad (3)$$

$$T \tan \theta_{obj} \leq x \leq L - T \tan \theta_{obj} \qquad (4)$$

In detail, the formula (1) defines a range of the incident angle of the light beam Q emitted from the dark-field illumination 400 via a lateral surface F' of the specimen carrier 20, the formula (2) defines another range of the incident angle of the light beam Q emitted from the dark-field illumination 400 towards the area A of the specimen carrier 20 through secondary reflection at the lateral surface F, the formula (3) defines further another range of the incident angle of the light beam Q emitted from the dark-field illumination 400 towards the area B of the specimen carrier 20 through secondary reflection at the lateral surface F, and the formula (4) defines a range of the relative distance of the specimen carrier 20 referring to effective bright field. With the restrictions of the formulas (1) to (4), in the process of switching between bright-field image capturing and dark-field image capturing, the specimen 30 in the specimen carrier 20 can be clearly observed with the same field of view of the microscope objective 200 through the dark-field illumination 400 or the bright-field illumination 500 without further movement of the specimen carrier 20.

An automated microscopic observation method of the disclosure is introduced hereinafter. The automated micro-scopic observation method is suitable for observing the specimen 30 in the specimen carrier 20. Please refer to FIG. 3, which is a flow chart of a method of observing the specimen carrier 20 by the microscopic observation device 10 in FIG. 1. Firstly, a step S110 is to place the specimen carrier 20 on the position movement element 300. In one embodiment, the step S110 includes, for example, a step of placing the specimen carrier 20 on the holders 310 of the position movement element 300, so that the specimen carrier 20 can be clamped by the holders 310 and fixed on the position movement element 300. Then, a step S120 is to activate the position movement element 300 to move the specimen carrier 20. In one embodiment, the step S120 includes, for example, a step of moving the specimen carrier 20 to an observation point. In detail, the observation point falls within the projection of the bright-field illumination 500. As such, in the process of switching between bright-field image capturing and dark-field image capturing, the specimen 30 in the specimen carrier 20 can be clearly observed through the dark-field illumination 400 or the bright-field illumination 500 without further movement of the specimen carrier 20. However, the present disclosure is not limited thereto. Then, a step S130 is to determine whether to perform a dark-field detection procedure. When the dark-field detection procedure is determined to be per-formed, then a step S140 is performed. The step S140 is to detect the length L of the specimen carrier 20 along the movement direction H and the relative distance x between the lateral surface F of the specimen carrier 20 and the microscope objective 200 along the movement direction H. In one embodiment, the lateral surface F is a surface opposite to the surface where the light beam Q enters into the specimen carrier 20. Then, a step S150 is to receive input values of the thickness T of the specimen carrier 20 along the observation direction of the microscope objective 200 and the observation angle $\theta_{obj}$ of the microscope objective 200. In one embodiment, the observation angle $\theta_{obj}$ is the maxi-mum angle between the central axis Y of the microscope objective 200 and the boundary of the observation area C; that is, half of the field of view of the microscope objective 200. The length L of the specimen carrier 20 along the movement direction H, the thickness T of the specimen carrier 20 along the observation direction of the microscope objective 200, the observation angle $\theta_{obj}$ of the microscope objective 200, and the relative distance x between the lateral surface F of the specimen carrier 20 and the microscope objective 200 along the movement direction H will be obtained through the steps S140 to S150. Then, a step S160 is to adjust the incident angle $\theta_{in}$ of the light beam Q emitted from the dark-field illumination 400 towards the specimen carrier 20 according to the calculation result of the length L, the thickness T, the observation angle $\theta_{obj}$, and the relative distance x. Then, a step S170 is to capture a dark-field image of the specimen 30 through the microscope objective 200. In one embodiment, a cell nucleus contour in the dark-field image of the specimen can be clearly observed without cell staining.

When the dark-field detection procedure is determined to be not performed, then a step S180 is performed. The step S180 is to capture a bright-field image of the specimen 30 through the microscope objective 200. The bright-field image is suitable for cell detail observation, and the bright-field image and the dark-field image are complementary to each other and therefore are able to improve the accuracy of image analysis. Further, the abovementioned steps for observing the specimen 30 can be automatically performed and thereby improving the observation speed of the speci-men 30.

The order of the abovementioned steps is not limiting. In some other embodiments, the order of the step S120 and the step S130 may be reversed, or the order of the step S140 and the step S150 may be reversed.

Optionally, before performing the steps of obtaining the length L, the observation angle $\theta_{obj}$, and the relative distance x for another specimen in the specimen carrier 20, a step of selecting a microscope objective 200 with a suitable mag-nification and aligning it with the specimen carrier 20 may be performed to let the specimen carrier 20 to fall within the observation area C of the selected microscope objective 200.

It is noted that the step S110 may be omitted when the specimen carrier 20 has been already placed on the position movement element 300.

Figure 4:
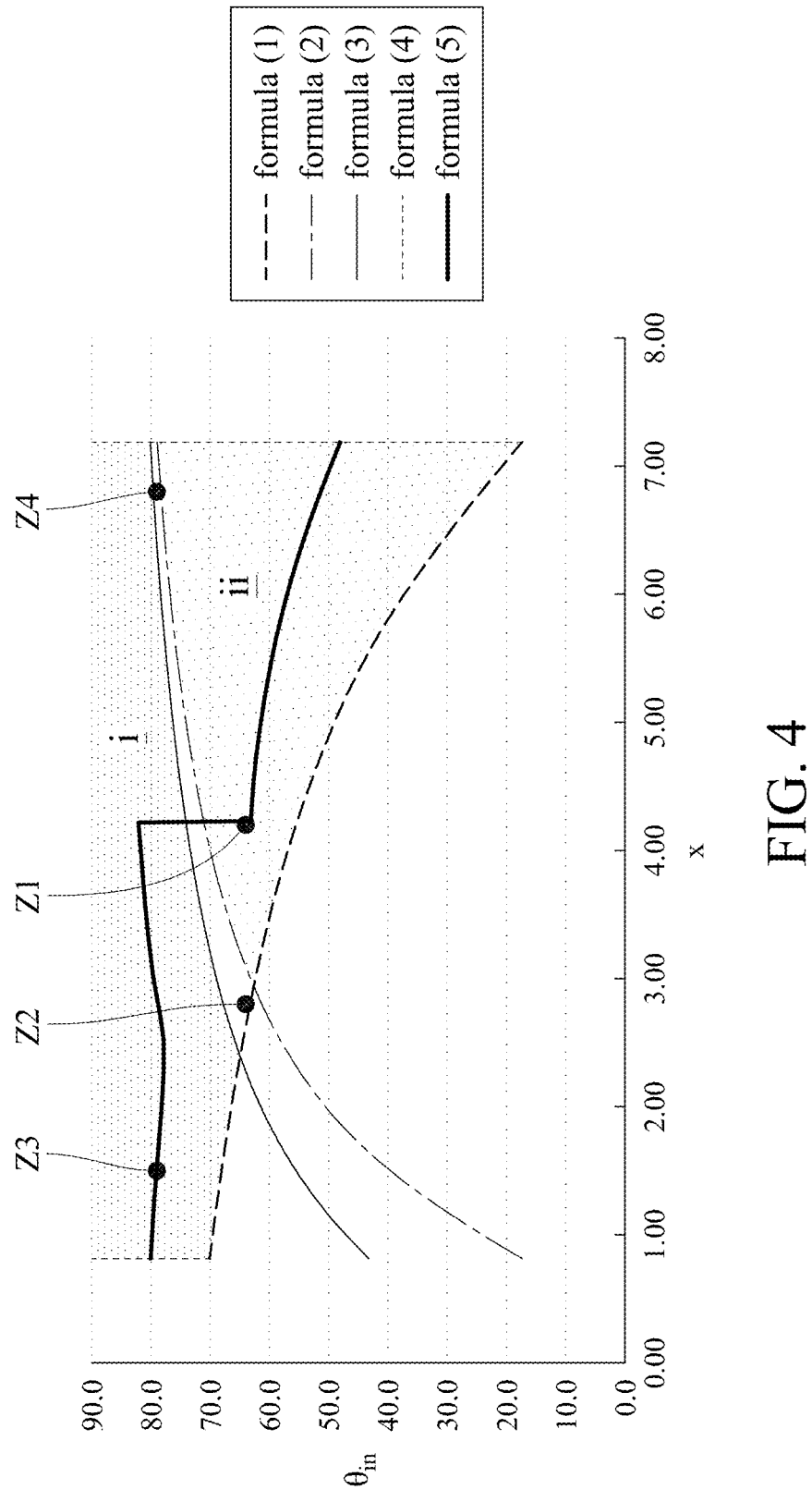
FIG. 4 is a curve chart showing the relationship between an incident angle of the dark-field illumination and a relative distance of the specimen carrier in FIG. 1.
Figure 6:
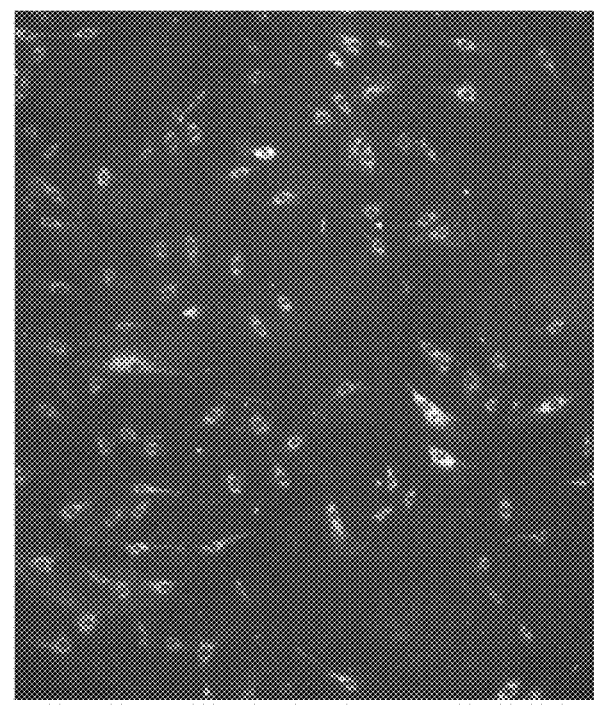
FIG. 5 to FIG. 8 are exemplary dark-field images captured under different incident angles of the dark-field illumination in FIG. 1.

Please refer to FIG. 1, FIG. 2 and further refer to FIG. 4, where FIG. 4 is a curve chart showing the relationship between an incident angle of the dark-field illumination 400 and a relative distance x of the specimen carrier in FIG. 1. In specific, FIG. 4 illustrates a curve chart showing the relationship between the incident angle $\theta_{in}$ of the dark-field illumination 400 and the relative distance x between the specimen carrier 20 and the microscope objective 200 according to the formulas (1) to (4) when $\theta_{obj}$ is 17.5°, L is 8 centimeters (cm), and T is 2.6 cm. In detail, the incident angle $\theta_{in}$ of the dark-field illumination 400 is the angle between the light beam Q emitted from the dark-field illumination 400 and the central axis Y of the microscope objective 200, and the relative distance x is the distance along the movement direction H between the lateral surface F of the specimen carrier 20 and the microscope objective 200. When values of the angle $\theta_{in}$ (i.e., the incident angle) and the relative distance x are located within an area i or ii, light emitted from the dark-field illumination 400 towards the observation area C through secondary reflection at the lateral surface F can be prevented, the observation of the specimen 30 through the observation area C will not be interfered by the secondarily reflected light, and image quality of the dark-field image will therefore be increased. In detail, the formulas (1), (3), and (4) form the area i; that is, values of the angle $\theta_{in}$ and the relative distance x located within the area i satisfy the formulas (1), (3), and (4), simultaneously. Under the conditions that values of the angle $\theta_{in}$ and the relative distance x are located within the area i, the light beam Q emitted from the dark-field illumination 400 through secondary reflection will illuminate the area B of the specimen carrier 20. The formulas (1), (2), and (4) form the area ii; that is, values of the angle $\theta_{in}$ and the relative distance x located within the area ii satisfy the formulas (1), (2), and (4), simultaneously. Under the conditions that values of the angle $\theta_{in}$ and the relative distance x are located within the area ii, the light beam Q emitted from the dark-field illumination 400 through secondary reflection will illuminate the area A of the specimen carrier 20. In this embodiment, the relative distance x, for example, ranges from 0.82 cm to 7.18 cm (0.82 [cm]≤x≤7.18 [cm]), which can be considered as the allowable movement range of the specimen carrier 20 in the dark box 100.

In this embodiment, the angle between the light beam Q emitted from the dark-field illumination 400 and the central axis Y of the microscope objective 200 is $\theta_{in}$, "$\theta_{in\_max}$" denotes to the maximum allowable value of the angle between the light beam Q emitted from the dark-field illumination 400 and the central axis Y (or the observation direction) of the microscope objective 200, "$\theta_{in\_min}$" denotes to the minimum allowable value of the angle between the light beam Q emitted from the dark-field illumination 400 and the central axis Y (or the observation direction) of the microscope objective 200, "$a_1$" and "$a_2$" denote to two constant coefficients, and the conditions of the formula (5) are satisfied. In one embodiment, each of $a_1$ and $a_2$ equals to, for example, 0.5.

$$\theta_{in}=a_1\theta_{in\_max}+a_2\theta_{in\_min}; \text{ and } a_1+a_2=1 \tag{5}$$

In this embodiment, the values satisfying the formula (5) form the thick solid line in FIG. 4. As shown in FIG. 4, the thick solid line in FIG. 4 can be considered as optimized values of the parameters in the areas i and ii.

Figure 5:
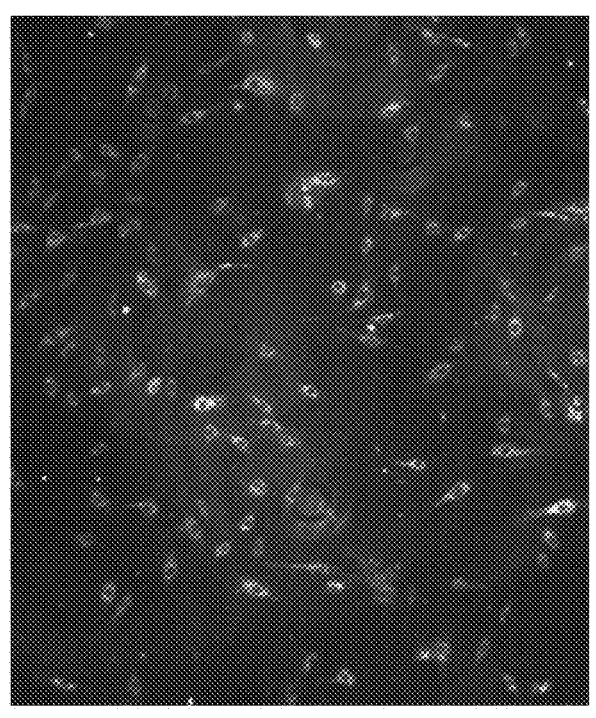
Figure 8:
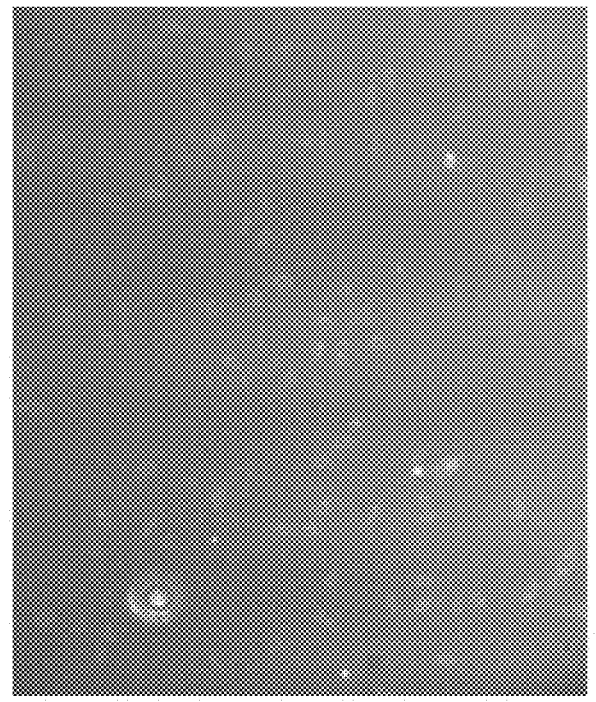
Figure 7:
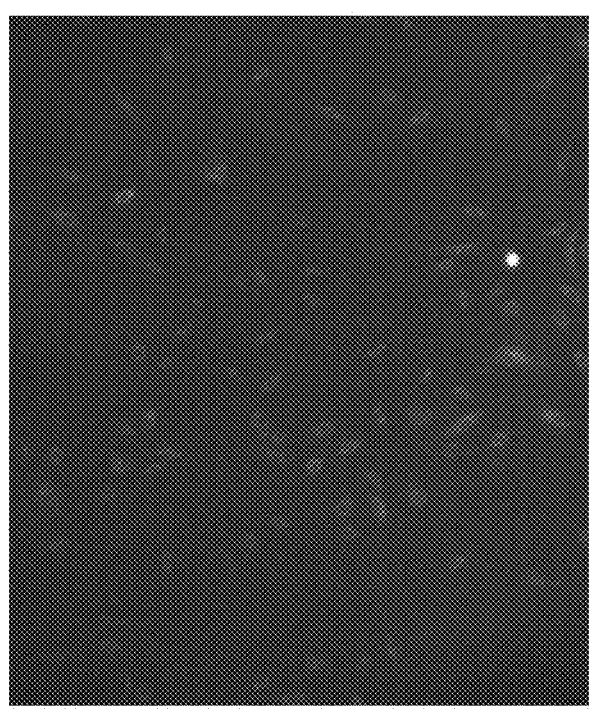

Please refer to FIG. 5 to FIG. 8, where FIG. 5 to FIG. 8 are exemplary dark-field images captured under different incident angles of the dark-field illumination 400 in FIG. 1. The dark-field image of FIG. 5 is captured under the conditions of x=4.2 and $\theta_{in}$=64° (point Z1 in FIG. 4). As shown in FIG. 5, the dark-field image is not interfered by the secondarily reflected light beam Q and therefore has good image quality. In contrast, the dark-field image of FIG. 6 captured under the conditions of x=2.8 and $\theta_{in}$=64° (point Z2 in FIG. 4) is interfered by the secondarily reflected light beam Q and has poor image quality due to overexposure. The dark-field image of FIG. 7 is captured under the conditions of x=1.5 and $\theta_{in}$=790 (point Z3 in FIG. 4). As shown in FIG. 7, the dark-field image is not interfered by the secondarily reflected light beam Q and therefore has good image quality. In contrast, the dark-field image of FIG. 8 captured under the conditions of x=6.8 and $\theta_{in}$=790 (point Z4 in FIG. 4) is interfered by the secondarily reflected light beam Q and has poor image quality due to overexposure.

Figure 9:
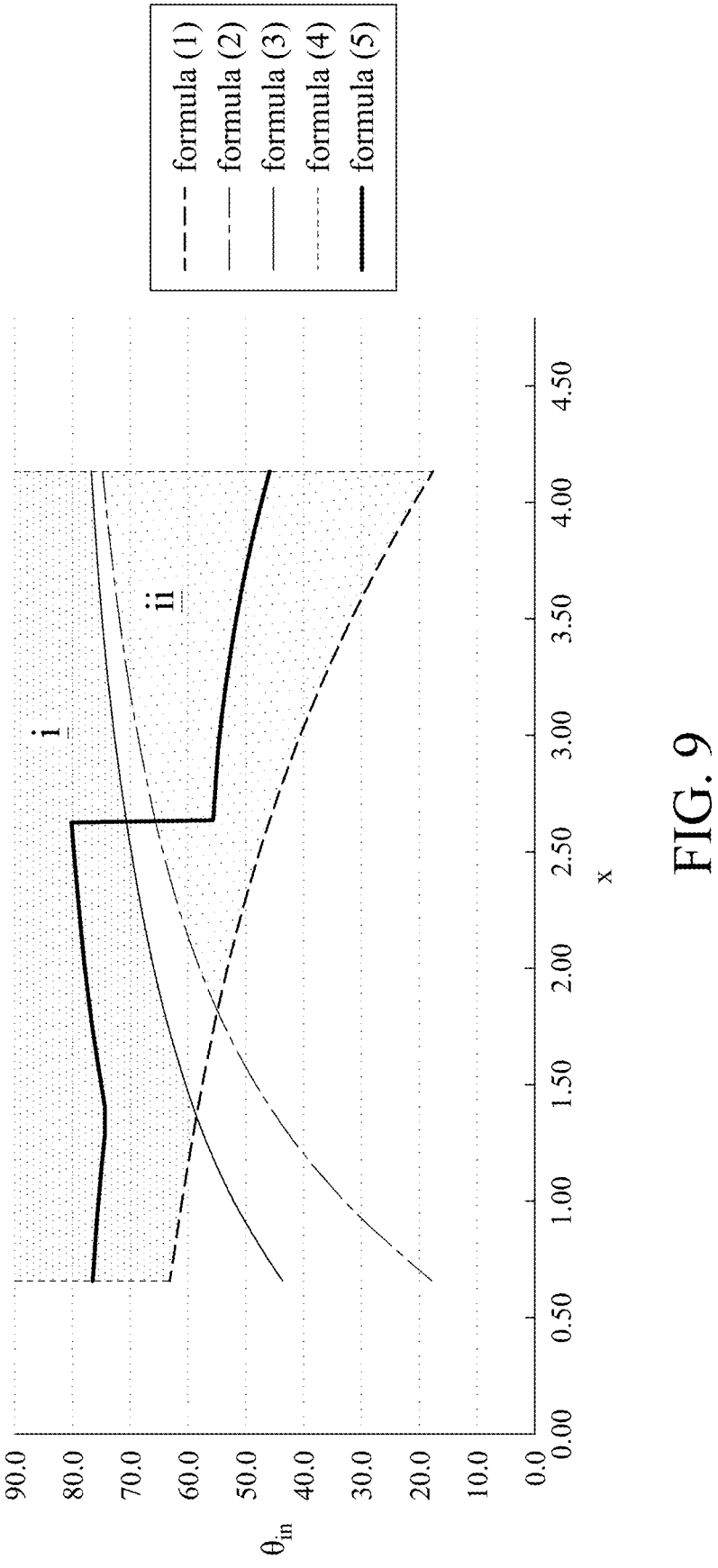
FIG. 9 is a curve chart showing the relationship between an incident angle of the dark-field illumination and a relative distance of the specimen carrier in FIG. 1 with another specimen carrier of different size.

Please refer to FIG. 9, which is a curve chart showing the relationship between an incident angle of the dark-field illumination 400 and a relative distance x of the specimen carrier in FIG. 1 with another specimen carrier 20 of different size.

FIG. 9 illustrates a curve chart showing the relationship between the incident angle $\theta_{in}$ of the dark-field illumination 400 and the relative distance x between the specimen carrier 20 and the microscope objective 200 according to the formulas (1) to (4) when $\theta_{obj}$ is 17.5°, L is 4.8 cm, and T is 2.1 cm. When values of the angle $\theta_{in}$ and the relative distance x are located within an area i or ii, light emitted from the dark-field illumination 400 towards the observation area C through secondary reflection at the lateral surface F can be prevented, the observation of the specimen 30 through the observation area C will not be interfered by the secondarily reflected light, and image quality of the dark-field image will therefore be increased. In this embodiment, the relative distance x, for example, ranges from 0.66 cm to 4.14 cm (0.66 [cm]≤x≤4.14 [cm]), which can be considered as the allowable movement range of the specimen carrier 20 in the dark box 100.

Similarly, in this embodiment, the values satisfying the formula (5) form the thick solid line in FIG. 9. As shown in FIG. 9, the thick solid line in FIG. 9 can be considered as optimized values of the parameters in the areas i and ii.

Figure 10:
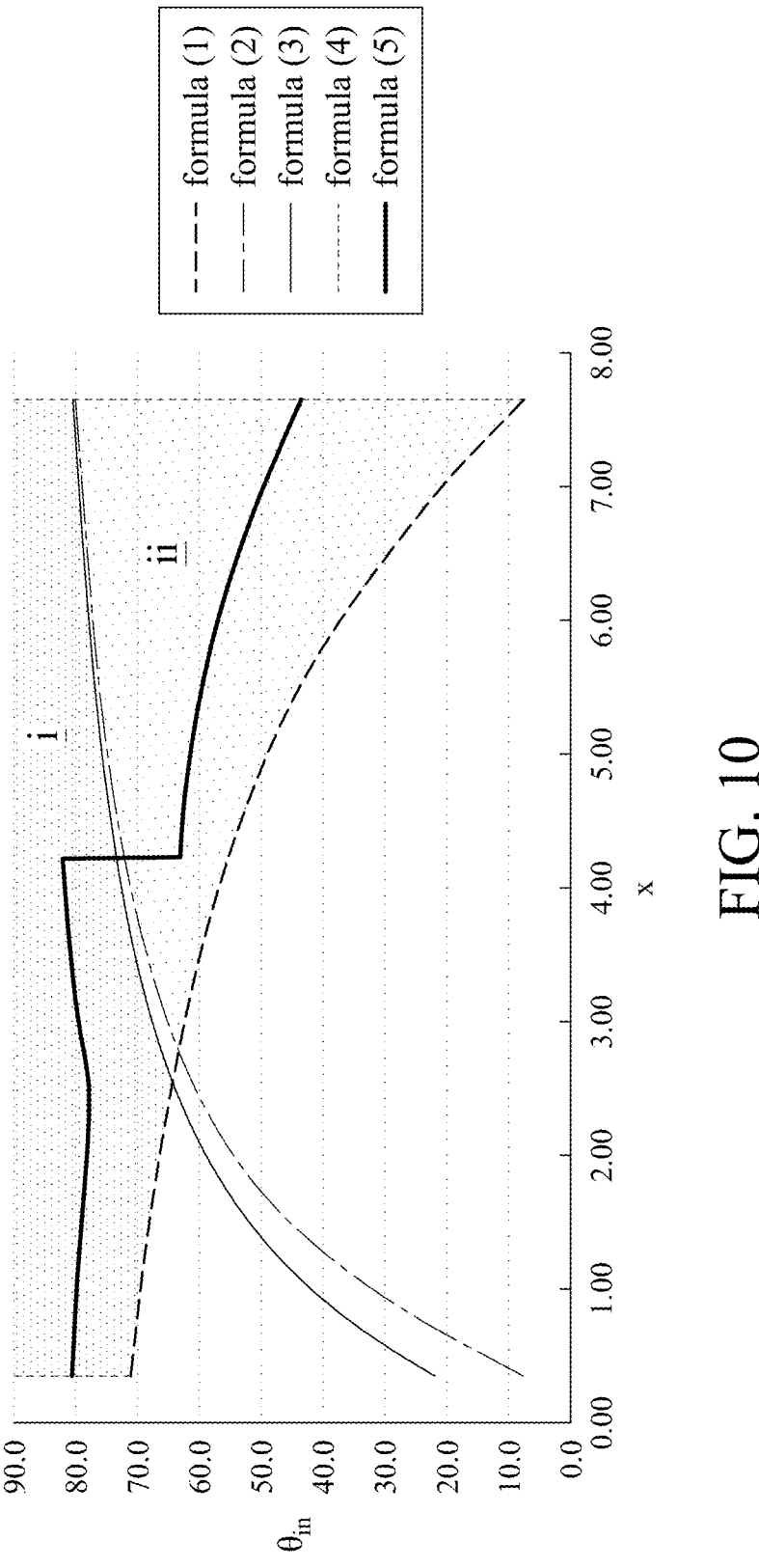
FIG. 10 is a curve chart showing the relationship between an incident angle of the dark-field illumination and a relative distance of the specimen carrier in FIG. 1 with another microscope objective of different magnification.

Please refer to FIG. 10, which is a curve chart showing the relationship between an incident angle of the dark-field illumination 400 and a relative distance x of the specimen carrier in FIG. 1 with another microscope objective 200 of different magnification.

FIG. 10 illustrates a curve chart showing the relationship between the incident angle $\theta_{in}$ of the dark-field illumination 400 and the relative distance x between the specimen carrier 20 and the microscope objective 200 according to the formulas (1) to (4) when $\theta_{obj}$ is 7.5°, L is 8 cm, and T is 2.6 cm. When values of the angle $\theta_{in}$ and the relative distance x are located within an area i or ii, light emitted from the dark-field illumination 400 towards the observation area C through secondary reflection at the lateral surface F can be prevented, the observation of the specimen 30 through the observation area C will not be interfered by the secondarily reflected light, and image quality of the dark-field image will therefore be increased. In this embodiment, the relative distance x, for example, ranges from 0.34 cm to 7.66 cm (0.34 [cm]≤x≤7.66 [cm]), which can be considered as the allowable movement range of the specimen carrier 20 in the dark box 100.

Similarly, in this embodiment, the values satisfying the formula (5) form the thick solid line in FIG. 10. As shown in FIG. 10, the thick solid line in FIG. 10 can be considered as optimized values of the parameters in the areas i and ii.

Figure 11:
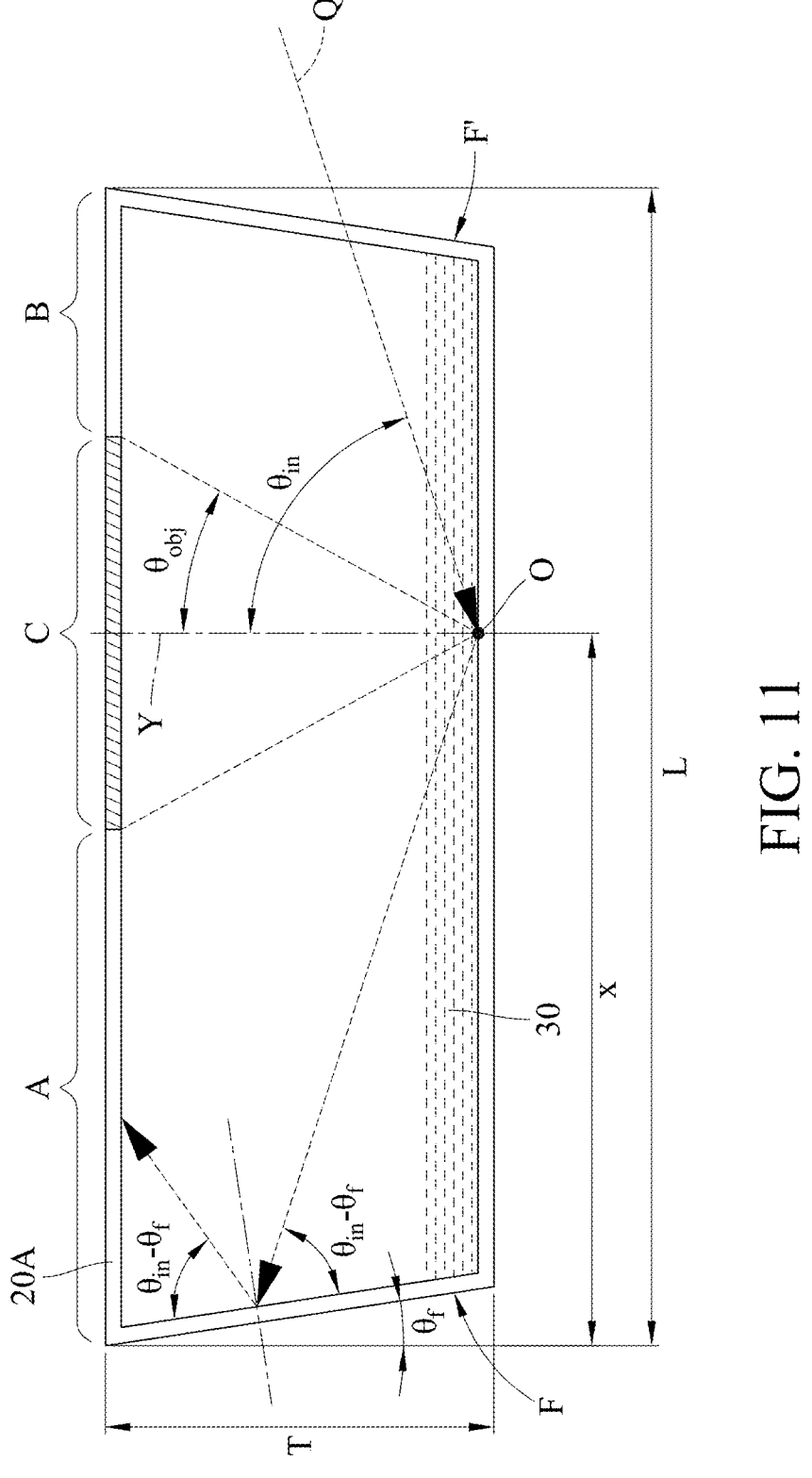
FIG. 11 is a schematic side view of a specimen carrier in a microscopic observation device according to a second embodiment illuminated by a dark-field illumination.

Note that the vertical lateral surface F of the specimen carrier 20 in the first embodiment referring to FIG. 1 is not limiting. Please refer to FIG. 11, which is a schematic side view of a specimen carrier 20A in a microscopic observation device according to a second embodiment illuminated by a dark-field illumination 400. The specimen carrier 20 in the first embodiment referring to FIG. 1 is replaced with a specimen carrier 20A in this embodiment. As shown in FIG. 11, the specimen carrier 20A in this embodiment has an inclined lateral surface F. Due to the inclined lateral surface F, the microscopic observation method in this embodiment further includes a step of obtaining an angle between the lateral surface F of the specimen carrier 20A and the central axis Y (or the observation direction) of the microscope objective 200 besides the steps of the microscopic observation method in the first embodiment referring to FIG. 1. Similarly, "$\theta_{in}$" denotes to the angle between the light beam Q emitted from the dark-field illumination 400 and the central axis Y of the microscope objective 200, "$\theta_{obj}$" denotes to the observation angle of the microscope objective 200, "$\theta_f$" denotes to the angle between the lateral surface F of the specimen carrier 20A and the central axis Y (or the observation direction) of the microscope objective 200, "L"

denotes to the length of the specimen carrier 20A along the movement direction H of the specimen carrier 20A, "x" denotes to the relative distance along the movement direction H between an end of the position movement element 300 located away from the dark-field illumination 400 along the movement direction H and the observation direction of the microscope objective 200, "T" denotes to the thickness of the specimen carrier 20A along the observation direction of the microscope objective 200, and the following formulas (1), (4), (6) and (7) are constituted by the abovementioned parameters. With the restrictions of the formulas (1), (4), (6) and (7), the secondary reflection of the light beam Q coming from the dark-field illumination 400 occurring at the lateral surface F of the specimen carrier 20 is prevented from emitting towards the observation area C. That is, the secondarily reflected light coming from the dark-field illumination 400 will only illuminate an area A or B other than the observation area C.

$$\theta_{in} \geq \tan^{-1}\frac{L-x}{T} \tag{1}$$

$$T\tan\theta_{obj} \leq x \leq L - T\tan\theta_{obj} \tag{4}$$

$$\theta_{in} \leq \tan^{-1}\left(\frac{(x-T\tan\theta_{obj})(\tan\theta_{in}-\tan\theta_f)}{(\tan(\theta_{in}-2\theta_f)+\tan\theta_f)T}+\frac{x}{T}\right) \tag{6}$$

$$\theta_{in} \geq \tan^{-1}\left(\frac{(x+T\tan\theta_{obj})(\tan\theta_{in}-\tan\theta_f)}{(\tan(\theta_{in}-2\theta_f)+\tan\theta_f)T}+\frac{x}{T}\right) \tag{7}$$

In detail, the formula (1) defines a range of the incident angle of the light beam Q emitted from the dark-field illumination 400 via a lateral surface F' of the specimen carrier 20A, the formula (6) defines another range of the incident angle of the light beam Q emitted from the dark-field illumination 400 towards the area A of the specimen carrier 20A through secondary reflection at the lateral surface F, formula (7) defines further another range of the incident angle of the light beam Q emitted from the dark-field illumination 400 towards the area B of the specimen carrier 20A through secondary reflection at the lateral surface F, and formula (4) defines a range of the relative distance of the specimen carrier 20A referring to effective bright field. With the restrictions of the formulas (1), (4), (6) and (7), in the process of switching between bright-field image capturing and dark-field image capturing, the specimen 30 in the specimen carrier 20A can be clearly observed with the same field of view of the microscope objective 200 through the dark-field illumination 400 or the bright-field illumination 500 without further movement of the specimen carrier 20A.

Figure 12:
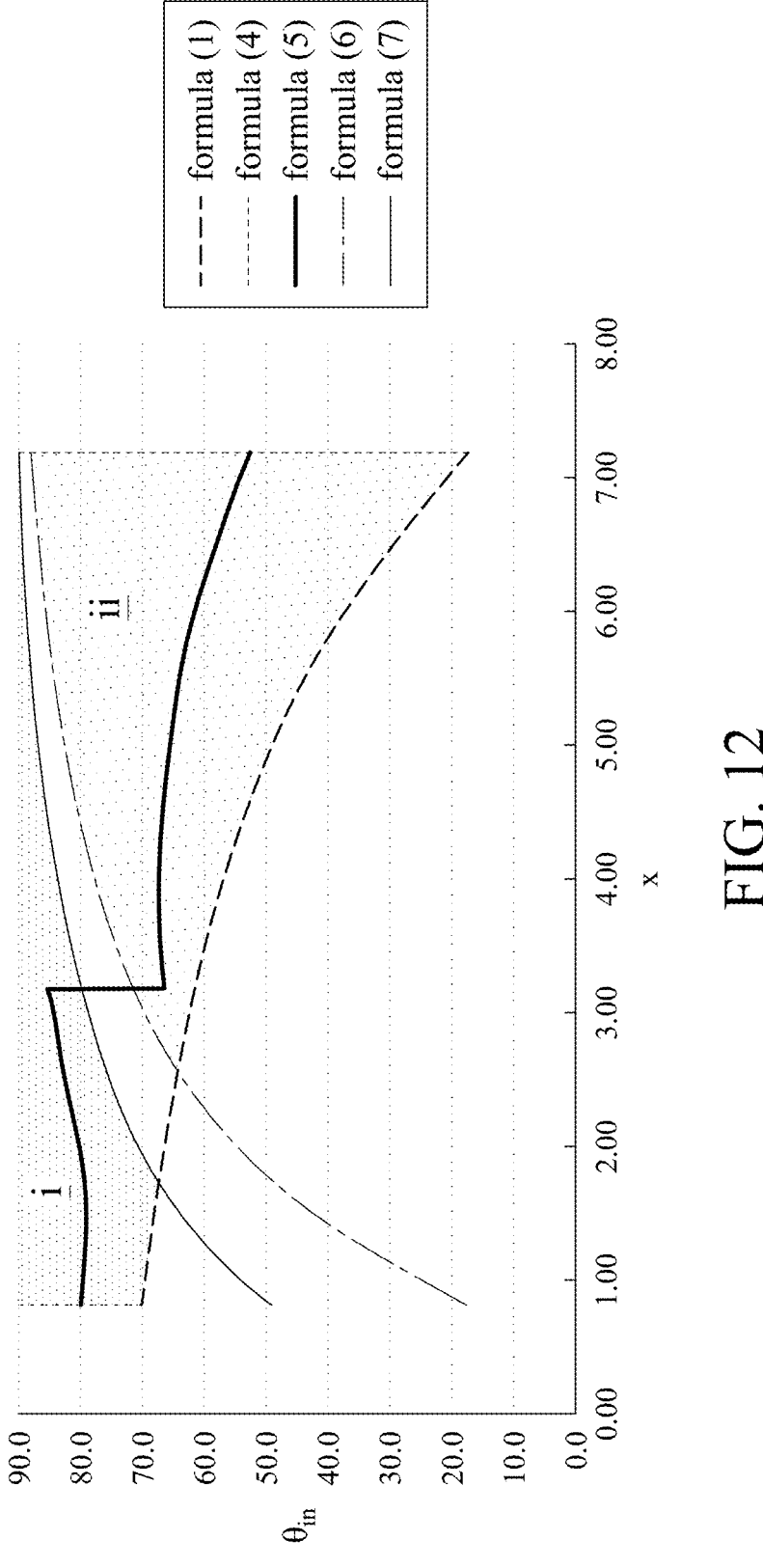
FIG. 12 is a curve chart showing the relationship between an incident angle of the dark-field illumination and a relative distance in FIG. 11.

Please refer to FIG. 12, which is a curve chart showing the relationship between an incident angle of the dark-field illumination 400 and a relative distance x in FIG. 11.

FIG. 12 illustrates a curve chart showing the relationship between the incident angle $\theta_{in}$ of the dark-field illumination 400 and the relative distance x between the specimen carrier 20A and the microscope objective 200 according to the formulas (1), (4), (6) and (7) when $\theta_{obj}$ is 17.5°, $\theta_f$ is 10°, L is 8 cm, and T is 2.6 cm. In detail, the incident angle $\theta_{in}$ of the dark-field illumination 400 is the angle between the light beam Q emitted from the dark-field illumination 400 and the central axis Y of the microscope objective 200, and the relative distance x is the distance along the movement direction H between the lateral surface F of the specimen carrier 20A and the microscope objective 200. When values of the angle $\theta_{in}$ (i.e., the incident angle) and the relative distance x are located within an area i or ii, light emitted from the dark-field illumination 400 towards the observation area C through secondary reflection at the lateral surface F can be prevented, and image quality of the dark-field image will therefore be increased. In detail, the formulas (1), (4), and (7) form the area i; that is, values of the angle $\theta_{in}$ and the relative distance x located within the area i satisfy the formulas (1), (4), and (7), simultaneously. Under the conditions that values of the angle $\theta_{in}$ and the relative distance x are located within the area i, the light beam Q emitted from the dark-field illumination 400 through secondary reflection will illuminate the area B of the specimen carrier 20A. The formulas (1), (4), and (6) form the area ii; that is, values of the angle $\theta_{in}$ and the relative distance x located within the area ii satisfy the formulas (1), (4), and (6), simultaneously. Under the conditions that values of the angle $\theta_{in}$ and the relative distance x are located within the area ii, the light beam Q emitted from the dark-field illumination 400 through secondary reflection will illuminate the area A of the specimen carrier 20A. In this embodiment, the relative distance x, for example, ranges from 0.82 cm to 7.18 cm (0.82 [cm]≤x≤7.18 [cm]), which can be considered as the allowable movement range of the specimen carrier 20A in the dark box 100.

Similarly, in this embodiment, the values satisfying the formula (5) can form the thick solid line in FIG. 12. As shown in FIG. 12, the thick solid line in FIG. 12 can be considered as optimized values of the parameters in the areas i and ii.

Note that the light beam Q emitted from the dark-field illumination 400 in the first embodiment referring to FIG. 1 is not limited to entering the specimen carrier 20 only via the lateral surface F'. Please refer to FIG. 13, which is a schematic side view of a specimen carrier 20B in a microscopic observation device according to a third embodiment illuminated by a dark-field illumination 400. In this embodiment, the light beam Q emitted from the dark-field illumination 400 will enter the specimen carrier 20B via a lateral surface F' or the area B. Similarly, "$\theta_{in}$" denotes to the angle between the light beam Q emitted from the dark-field illumination 400 and the observation direction of the microscope objective 200 (in parallel with the central axis Y of the microscope objective 200), "$\theta_{obj}$" denotes to the observation angle of the microscope objective 200, "L" denotes to the length of the specimen carrier 20B along the movement direction H of the specimen carrier 20B, "x" denotes to the relative distance along the movement direction H between an end of the position movement element 300 located away from the dark-field illumination 400 along the movement direction H and the observation direction of the microscope objective 200, "T" denotes to the thickness of the specimen carrier 20B along the observation direction of the microscope objective 200, and the following formulas (2) to (4) and (8) are constituted by the abovementioned parameters. With the restrictions of the formulas (2) to (4) and (8), the secondary reflection of the light beam Q coming from the dark-field illumination 400 occurring at the lateral surface F of the specimen carrier 20 is prevented from emitting towards the observation area C. That is, the secondarily reflected light coming from the dark-field illumination 400 will only illuminate an area A or B other than the observation area C.

$$\theta_{in} \leq \tan^{-1}\frac{2x-T\tan\theta_{obj}}{T} \tag{2}$$

-continued $$\theta_{in} \geq \tan^{-1}\frac{2x + T\tan\theta_{obj}}{T} \qquad (3)$$

$$T\tan\theta_{obj} \leq x \leq L - T\tan\theta_{obj} \qquad (4)$$

$$\theta_{in} \geq \theta_{obj} \qquad (8)$$

In detail, the formula (8) defines a range of the incident angle of the light beam Q emitted from the dark-field illumination 400 via the lateral surface F' or the area B of the specimen carrier 20B, the formula (2) defines another range of the incident angle of the light beam Q emitted from the dark-field illumination 400 towards the area A of the specimen carrier 20B through secondary reflection at the lateral surface F, formula (3) defines further another range of the incident angle of the light beam Q emitted from the dark-field illumination 400 towards the area B of the specimen carrier 20B through secondary reflection at the lateral surface F, and formula (4) defines a range of the relative distance of the specimen carrier 20B referring to effective bright field. With the restrictions of the formulas (2) to (4) and (8), in the process of switching between bright-field image capturing and dark-field image capturing, the specimen 30 in the specimen carrier 20B can be clearly observed with the same field of view of the microscope objective 200 through the dark-field illumination 400 or the bright-field illumination 500 without further movement of the specimen carrier 20B.

Figure 13:
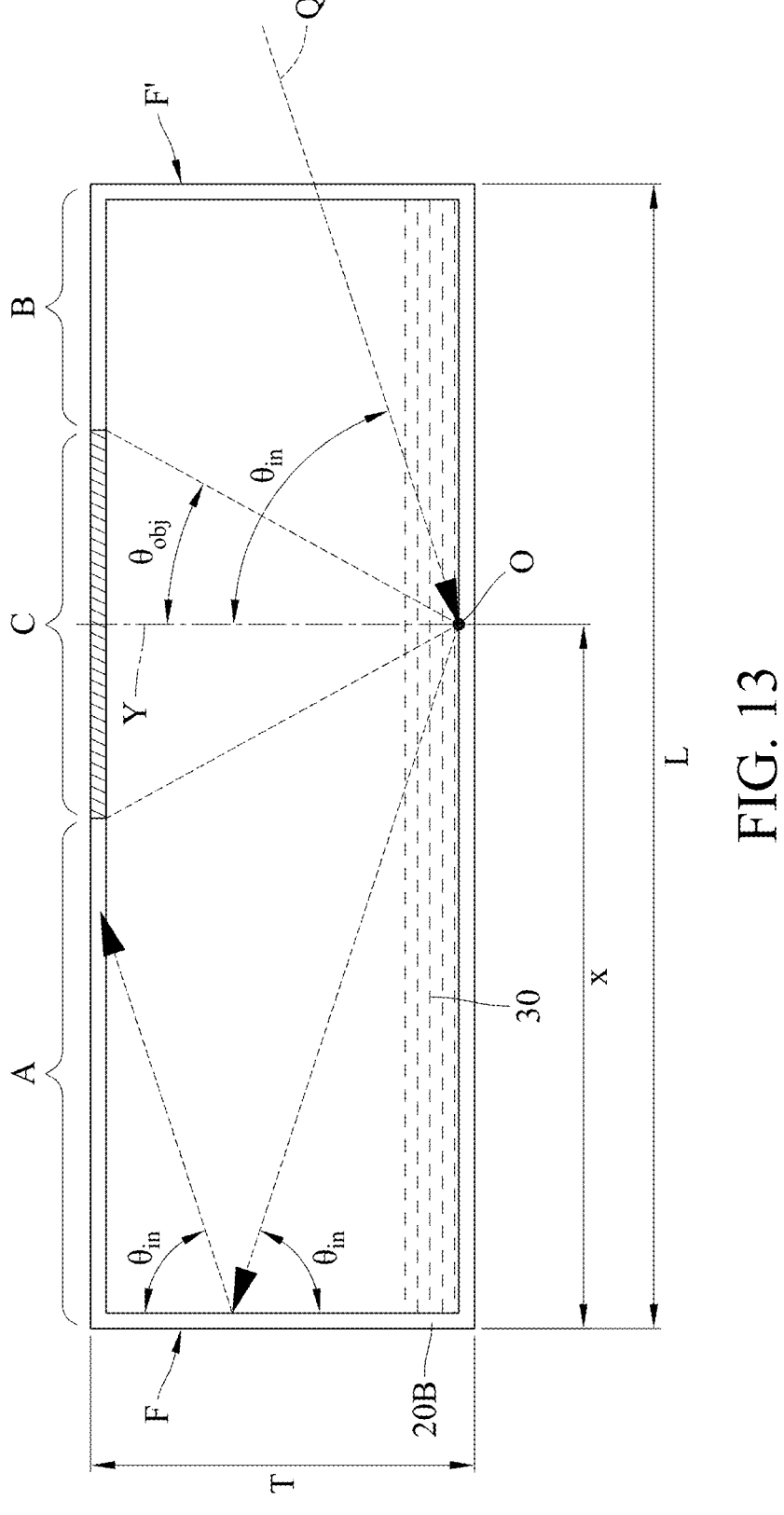
FIG. 13 is a schematic side view of a specimen carrier in a microscopic observation device according to a third embodiment illuminated by a dark-field illumination.
Figure 14:
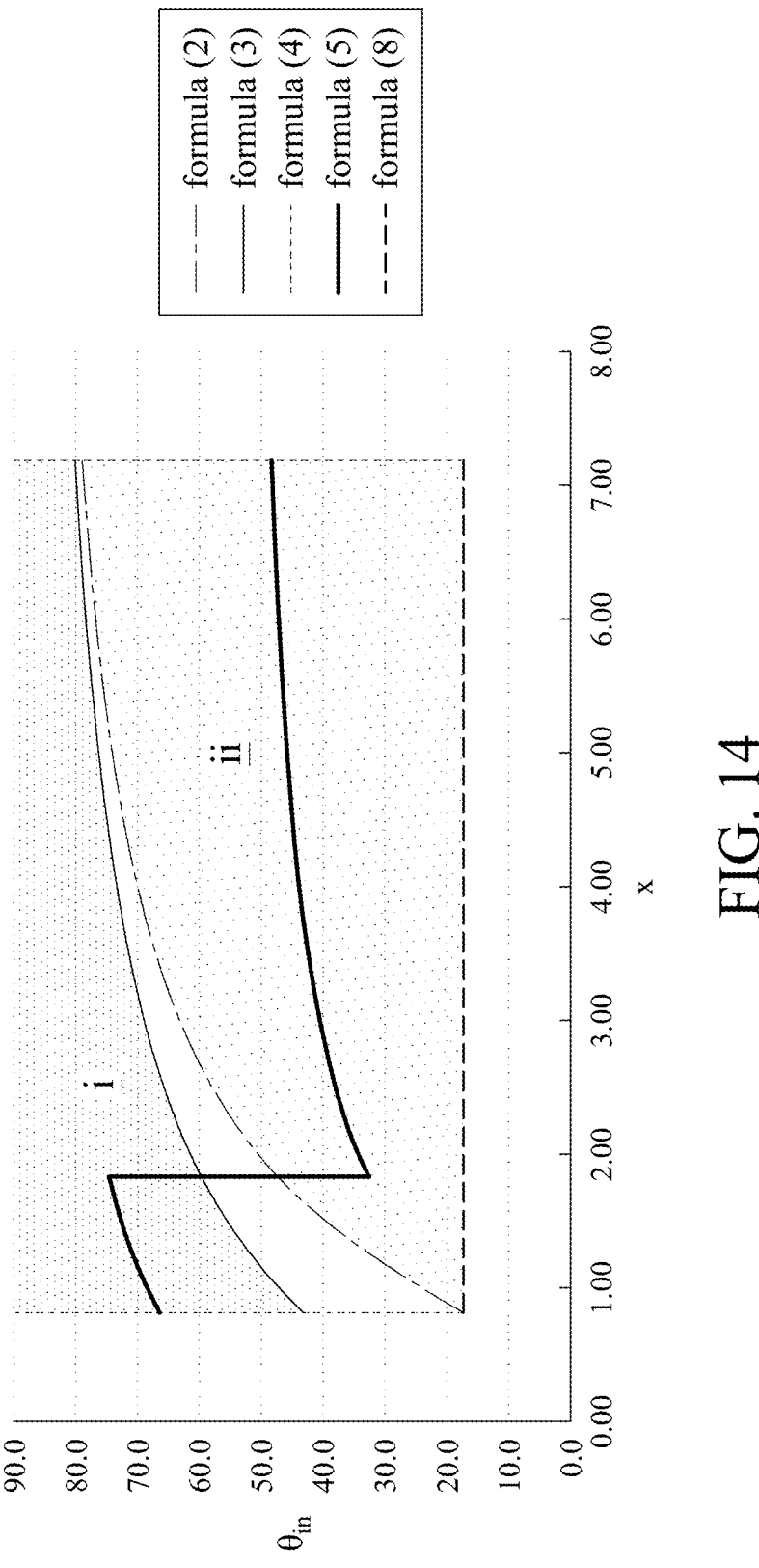
FIG. 14 is a curve chart showing the relationship between an incident angle of the dark-field illumination and a relative distance in FIG. 13.

Please refer to FIG. 14, which is a curve chart showing the relationship between an incident angle of the dark-field illumination 400 and a relative distance x of the specimen carrier in FIG. 13.

FIG. 14 illustrates a curve chart showing the relationship between the incident angle $\theta_{in}$ of the dark-field illumination 400 and the relative distance x between the specimen carrier 20B and the microscope objective 200 according to the formulas (2) to (4) and (8) when $\theta_{obj}$ is 17.5°, L is 8 cm, and T is 2.6 cm. When values of the angle $\theta_{in}$ and the relative distance x are located within an area i or ii, light emitted from the dark-field illumination 400 towards the observation area C through secondary reflection at the lateral surface F can be prevented, and image quality of the dark-field image will therefore be increased. In this embodiment, the relative distance x, for example, ranges from 0.82 cm to 7.18 cm (0.82 [cm]≤x≤7.18 [cm]), which can be considered as the allowable movement range of the specimen carrier 20B in the dark box 100.

Similarly, in this embodiment, the values satisfying the formula (5) can form the thick solid line in FIG. 14. As shown in FIG. 14, the thick solid line in FIG. 14 can be considered as optimized values of the parameters in the areas i and ii.

Figure 15:
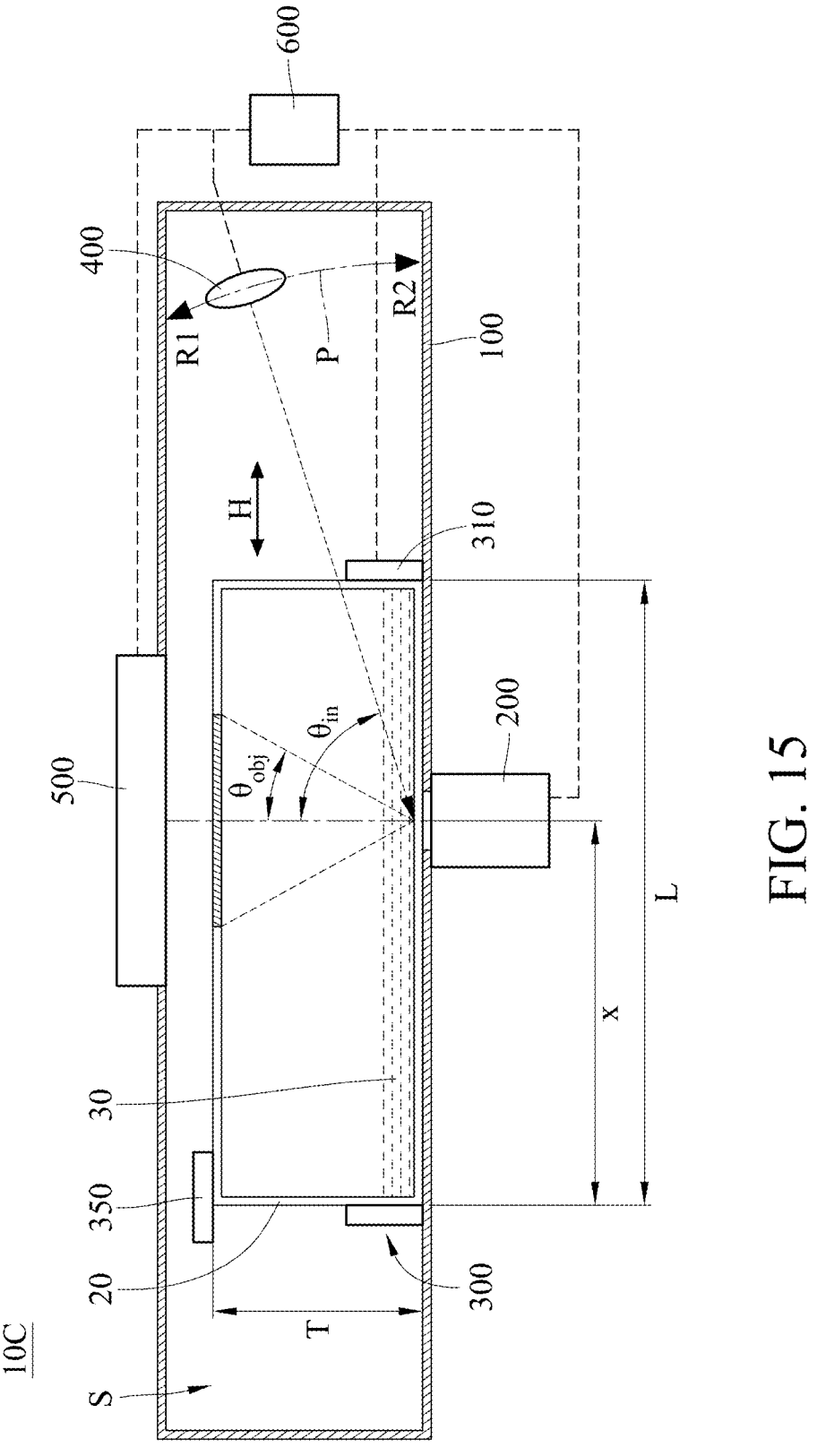
FIG. 15 is a schematic side view of a microscopic observation device according to a fourth embodiment of the present disclosure.

Please refer to FIG. 15, which is a schematic side view of a microscopic observation device 10C according to a fourth embodiment of the present disclosure. Note that a microscopic observation device 10C provided in this embodiment is similar to the microscopic observation device 10 in the first embodiment referring to FIG. 1, and the same features between this and the first embodiments will be omitted hereinafter. As shown in FIG. 15, the microscopic observation device 10C of this embodiment further includes a jig 350 that is movably disposed in the dark box 100. The jig 350 is suitable for abutting on the top of the specimen carrier 20 for detecting the thickness T of the specimen carrier 20. Further, the length L of the specimen carrier 20 can be obtained through the holders 310 included in the position movement element 300 by abutting on the specimen carrier 20, and the relative distance x between the lateral surface F of the specimen carrier 20 and the microscope objective 200 can be obtained by detecting the relative position between one of the holders 310 located away from the dark-field illumination 400 and the microscope objective 200.

Note that the microscopic observation method in the first embodiment referring to FIG. 1 including the dark-field detection procedure and the bright-field detection procedure is not limited to the present disclosure. Please refer to FIG. 16, which is a flow chart of a method of observing the specimen carrier 20 by the microscopic observation device 10C in FIG. 15.

Firstly, a step S210 is to place the specimen carrier 20 on the position movement element 300. In one embodiment, the step S210 includes, for example, a step of placing the specimen carrier 20 on the holders 310 of the position movement element 300, so that the specimen carrier 20 can be clamped by the holders 310 and fixed on the position movement element 300. Then, a step S220 is to activate the position movement element 300 to move the specimen carrier 20. In one embodiment, the step S220 includes, for example, a step of moving the specimen carrier 20 to an observation point. In detail, the observation point falls within the projection of the bright-field illumination 500. As such, in the process of switching between bright-field image capturing and dark-field image capturing, the specimen 30 in the specimen carrier 20 can be clearly observed through the dark-field illumination 400 or the bright-field illumination 500 without further movement of the specimen carrier 20. However, the present disclosure is not limited thereto. Then, a step S230 is to detect the length L of the specimen carrier 20 along the movement direction H, the thickness T of the specimen carrier 20 along the observation direction of the microscope objective 200, and the relative distance x between the lateral surface F of the specimen carrier 20 and the microscope objective 200 along the movement direction H. In one embodiment, the lateral surface F is a surface opposite to the surface where the light beam Q enters into the specimen carrier 20. Then, a step S240 is to receive input values of the observation angle $\theta_{obj}$ of the microscope objective 200. In one embodiment, the observation angle $\theta_{obj}$ is the maximum angle between the central axis Y of the microscope objective 200 and the boundary of the observation area C; that is, half of the field of view of the microscope objective 200. The length L of the specimen carrier 20 along the movement direction H, the thickness T of the specimen carrier 20 along the observation direction of the microscope objective 200, the observation angle $\theta_{obj}$ of the microscope objective 200, and the relative distance x between the lateral surface F of the specimen carrier 20 and the microscope objective 200 along the movement direction H will be obtained through the steps S230 to S240. Then, a step S250 is to adjust the incident angle $\theta_{in}$ of the light beam Q emitted from the dark-field illumination 400 towards the specimen carrier 20 according to the calculation result of the length L, the thickness T, the observation angle $\theta_{obj}$, and the relative distance x.

The order of the abovementioned steps is not limiting. In some other embodiments, the order of the step S230 and the step S240 may be reversed.

Figures 17, 18:
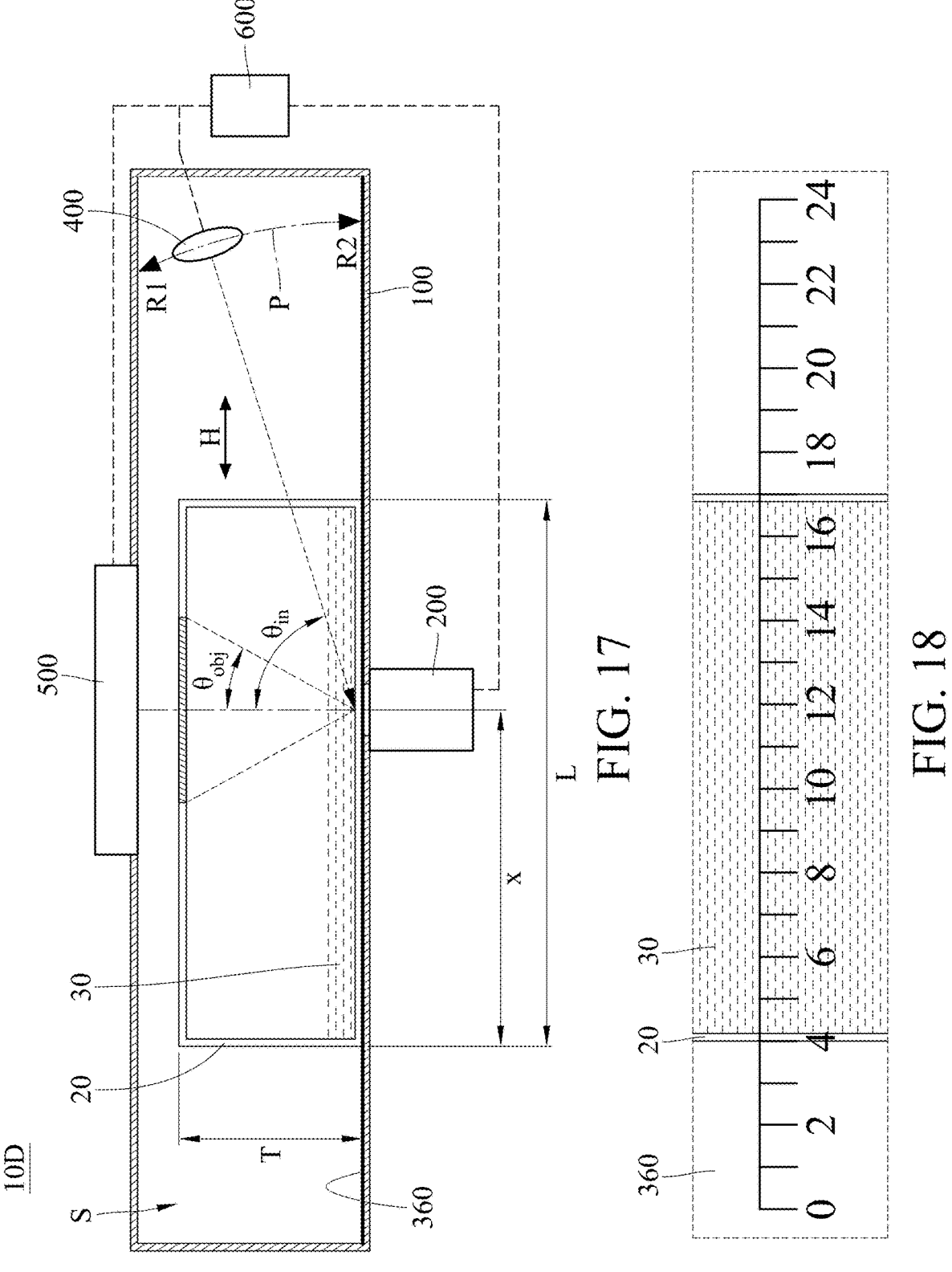
FIG. 17 is a schematic side view of a microscopic observation device according to a fifth embodiment of the present disclosure.
FIG. 18 is another schematic side view of a specimen carrier of the microscopic observation device in FIG. 17 with a ruler.

Please refer to FIG. 17 and FIG. 18, where FIG. 17 is a schematic side view of a microscopic observation device 10D according to a fifth embodiment of the present disclosure, and FIG. 18 is another schematic side view of a specimen carrier 20 of the microscopic observation device in FIG. 17 with a ruler. Note that a microscopic observation device 10D provided in this embodiment is similar to the microscopic observation device 10 in the first embodiment referring to FIG. 1, and the same features between this and the first embodiments will be omitted hereinafter. As shown in FIG. 17 and FIG. 18, the microscopic observation device 10D of this embodiment uses a rule 360 to replace the position movement element 300 of the microscopic observation device 10 of the first embodiment referring to FIG. 1. The ruler 360 has a scale suitable for measuring the length L of the specimen carrier 20 through, for example, human eyes or a camera.

Note that the microscopic observation method in the first embodiment referring to FIG. 1 including the dark-field detection procedure and the bright-field detection procedure is not limited to the present disclosure. Please refer to FIG. 19, which is a flow chart of a method of observing the specimen carrier 20 by the microscopic observation device 10D in FIG. 17.

Firstly, a step S310 is to place the specimen carrier 20 at an observation point in the dark box 100. In detail, the observation point falls within the projection of the bright-field illumination 500. As such, in the process of switching between bright-field image capturing and dark-field image capturing, the specimen 30 in the specimen carrier 20 can be clearly observed through the dark-field illumination 400 or the bright-field illumination 500 without further movement of the specimen carrier 20. However, the present disclosure is not limited thereto. Then, a step S320 is to receive input values of the length L of the specimen carrier 20 along the movement direction H, the thickness T of the specimen carrier 20 along the observation direction of the microscope objective 200, the observation angle $\theta_{obj}$ of the microscope objective 200, and the relative distance x between the lateral surface F of the specimen carrier 20 and the microscope objective 200 along the movement direction H. In one embodiment, the lateral surface F is a surface opposite to the surface where the light beam Q enters into the specimen carrier 20. The length L of the specimen carrier 20 along the movement direction H, the thickness T of the specimen carrier 20 along the observation direction of the microscope objective 200, the observation angle $\theta_{obj}$ of the microscope objective 200, and the relative distance x between the lateral surface F of the specimen carrier 20 and the microscope objective 200 along the movement direction H will be obtained through the step S320. Then, a step S330 is to adjust the incident angle $\theta_{in}$ of the light beam Q emitted from the dark-field illumination 400 towards the specimen carrier 20 according to the calculation result of the length L, the thickness T, the observation angle $\theta_{obj}$, and the relative distance x.

Figure 20:
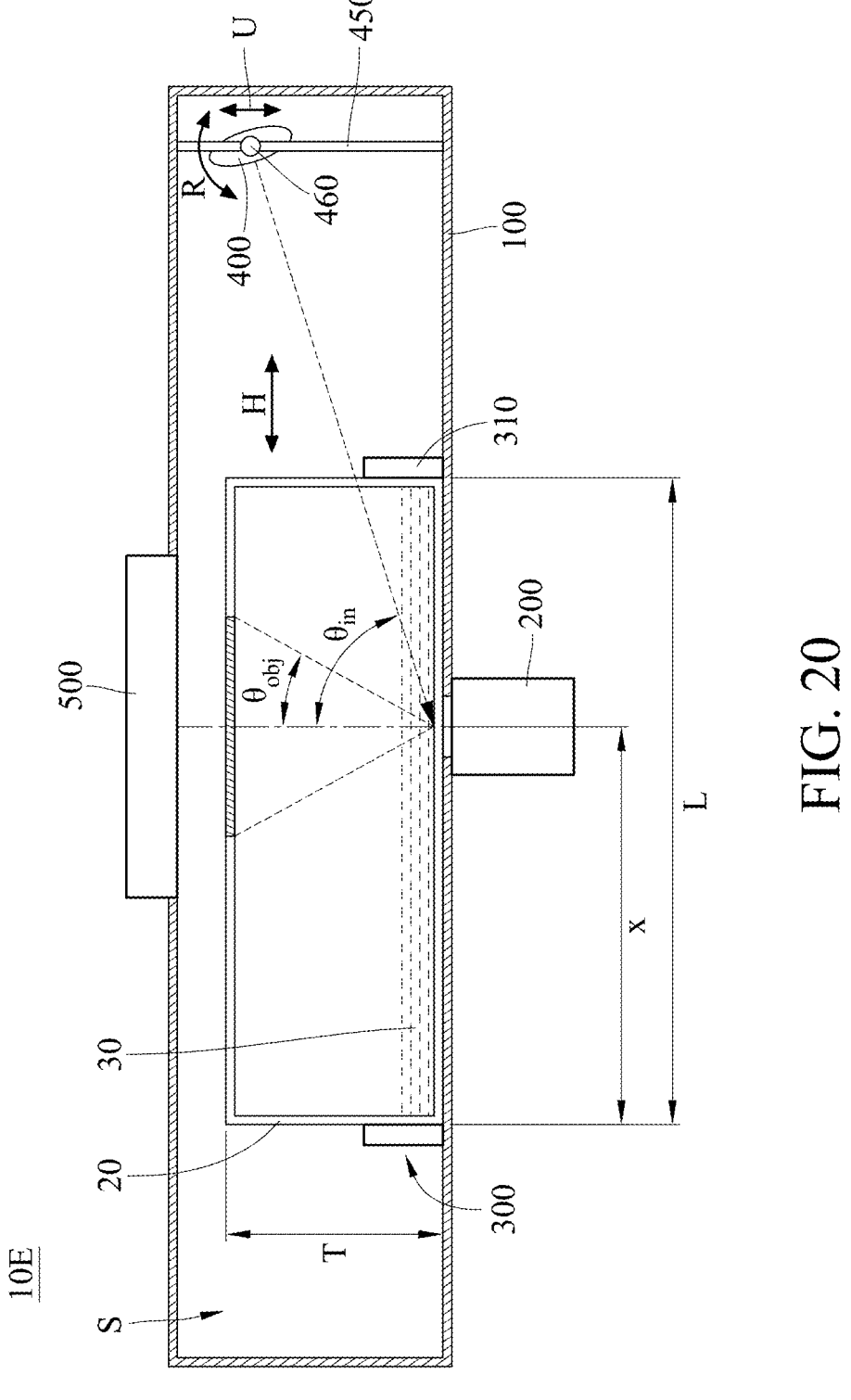
FIG. 20 is a schematic side view of a microscopic observation device according to a sixth embodiment of the present disclosure.

Please refer to FIG. 20, which is a schematic side view of a microscopic observation device 10E according to a sixth embodiment of the present disclosure. Note that a microscopic observation device 10E provided in this embodiment is similar to the microscopic observation device 10 in the first embodiment referring to FIG. 1, and the same features between this and the first embodiments will be omitted hereinafter. As shown in FIG. 20, the microscopic observation device 10E of this embodiment further includes a fixed component 450 and a slidable component 460. The dark-field illumination 400 is movably disposed in the dark box 100 through the fixed component 450 and the slidable component 460 for adjusting the incident angle $\theta_{in}$ of the light beam Q emitted from the dark-field illumination 400 towards the microscope objective 200. Specifically, the fixed component 450 is disposed in the accommodation space S of the dark box 100, the slidable component 460 is movably disposed on the fixed component 450 along a direction U, and the dark-field illumination 400 is rotatably disposed on the slidable component 460 along a direction R. As such, the incident angle $\theta_{in}$ of the light beam Q emitted from the dark-field illumination 400 towards the microscope objective 200 can be adjusted through the rotation and displacement of the dark-field illumination 400 with respect to the dark box 100.

According to the microscopic observation method and the microscopic observation device discussed above, the incident angle of the light beam emitted from the dark-field illumination towards the specimen carrier can be adjusted according to the calculation result of the length, the thickness, the observation angle and the relative distance, such that the automation microscopic observation device features automation convenience and quality image monitoring.

The embodiments are chosen and described in order to best explain the principles of the present disclosure and its practical applications, to thereby enable others skilled in the art best utilize the present disclosure and various embodiments with various modifications as are suited to the particular use being contemplated. It is intended that the scope of the present disclosure is defined by the following claims and their equivalents.

What is claimed is:

1. A microscopic observation method, configured to observe a specimen in a room formed between a bottom, a wall standing on the bottom and a cover disposed on the wall of a specimen carrier made of light-passable material, wherein steps of the microscopic observation method comprise:

placing the specimen carrier at an observation point;

obtaining a length of the bottom or the cover of the specimen carrier along a movement direction, a thickness of the wall of the specimen carrier along an observation direction of a microscope objective, an observation angle of the microscope objective, and a relative distance between a lateral surface of the wall of the specimen carrier and the microscope objective along the movement direction; and adjusting an incident angle of a light beam emitted from a dark-field illumination towards the specimen carrier according to a calculation result of the length, the thickness, the observation angle, and the relative distance for preventing the light beam emitting towards an observation area of the microscope objective;

wherein an optical path of the light beam emitted from the dark-field illumination to the observation point is located on an opposite side of the bottom of the specimen carrier away from the microscope objective.

2. The microscopic observation method according to claim 1, wherein the step of obtaining the length of the specimen carrier along the movement direction, the thickness of the specimen carrier along the observation direction of the microscope objective, the observation angle of the microscope objective, and the relative distance between the lateral surface of the specimen carrier and the microscope objective along the movement direction comprises:

detecting the length of the specimen carrier along the movement direction and the relative distance between the lateral surface of the specimen carrier and the microscope objective along the movement direction; and receiving input values of the thickness of the specimen carrier along the observation direction of the microscope objective and the observation angle of the microscope objective.

15

16

3. The microscopic observation method according to claim 1, wherein the step of obtaining the length of the specimen carrier along the movement direction, the thickness of the specimen carrier along the observation direction of the microscope objective, the observation angle of the microscope objective, and the relative distance between the lateral surface of the specimen carrier and the microscope objective along the movement direction comprises:

detecting the length of the specimen carrier along the movement direction, the thickness of the specimen carrier along the observation direction of the microscope objective, and the relative distance between the lateral surface of the specimen carrier and the microscope objective along the movement direction; and receiving an input value of the observation angle of the microscope objective.

4. The microscopic observation method according to claim 1, wherein the step of obtaining the length of the specimen carrier along the movement direction, the thickness of the specimen carrier along the observation direction of the microscope objective, the observation angle of the microscope objective, and the relative distance between the lateral surface of the specimen carrier and the microscope objective along the movement direction comprises:

receiving input values of the length of the specimen carrier along the movement direction, the thickness of the specimen carrier along the observation direction of the microscope objective, the observation angle of the microscope objective, and the relative distance between the lateral surface of the specimen carrier and the microscope objective along the movement direction.

5. The microscopic observation method according to claim 1, wherein an angle between the light beam emitted from the dark-field illumination and the observation direction of the microscope objective is $\theta_{in}$, the length of the specimen carrier along the movement direction is L, the relative distance between the lateral surface of the specimen carrier and the microscope objective along the movement direction is x, the thickness of the specimen carrier along the observation direction of the microscope objective is T, and a following condition is satisfied:

$$\theta_{in} \geq \tan^{-1} \frac{L-x}{T}.$$

6. The microscopic observation method according to claim 1, wherein an angle between the light beam emitted from the dark-field illumination and the observation direction of the microscope objective is $\theta_{in}$, the observation angle of the microscope objective is $\theta_{obj}$, and a following condition is satisfied:

$$\theta_{in} \geq \theta_{obj}.$$

7. The microscopic observation method according to claim 1, wherein an angle between the light beam emitted from the dark-field illumination and the observation direction of the microscope objective is $\theta_{in}$, the observation angle of the microscope objective is $\theta_{obj}$, the relative distance between the lateral surface of the specimen carrier and the microscope objective along the movement direction is x, the thickness of the specimen carrier along the observation direction of the microscope objective is T, and one of following conditions is satisfied:

$$\theta_{in} \leq \tan^{-1} \frac{2x - T \tan \theta_{obj}}{T} \text{ or } \theta_{in} \geq \tan^{-1} \frac{2x + T \tan \theta_{obj}}{T}.$$

8. The microscopic observation method according to claim 1, wherein after the step of placing the specimen carrier at the observation point, the method further comprises:

obtaining an angle between the lateral surface of the specimen carrier and the observation direction of the microscope objective.

9. The microscopic observation method according to claim 8, wherein an angle between the light beam emitted from the dark-field illumination and the observation direction of the microscope objective is $\theta_{in}$, the observation angle of the microscope objective is $\theta_{obj}$, the angle between the lateral surface of the specimen carrier and the observation direction of the microscope objective is $\theta_f$, the relative distance between the lateral surface of the specimen carrier and the microscope objective along the movement direction is x, the thickness of the specimen carrier along the observation direction of the microscope objective is T, and one of following conditions is satisfied:

$$\theta_{in} \leq \tan^{-1} \left( \frac{(x - T \tan \theta_{obj})(\tan \theta_{in} - \tan \theta_f)}{(\tan(\theta_{in} - 2\theta_f) + \tan \theta_f)T} + \frac{x}{T} \right); \text{ or}$$

$$\theta_{in} \geq \tan^{-1} \left( \frac{(x + T \tan \theta_{obj})(\tan \theta_{in} - \tan \theta_f)}{(\tan(\theta_{in} - 2\theta_f) + \tan \theta_f)T} + \frac{x}{T} \right).$$

10. The microscopic observation method according to claim 1, wherein the observation angle of the microscope objective is $\theta_{obj}$, the thickness of the specimen carrier along the observation direction of the microscope objective is T, the relative distance between the lateral surface of the specimen carrier and the microscope objective along the movement direction is x, the length of the specimen carrier along the movement direction is L, and following condition is satisfied:

$$T \tan \theta_{obj} \leq x \leq L - T \tan \theta_{obj}.$$

11. The microscopic observation method according to claim 1, wherein an angle between the light beam emitted from the dark-field illumination and the observation direction of the microscope objective is $\theta_{in}$, a maximum allowable value of the angle between the light beam emitted from the dark-field illumination and the observation direction of the microscope objective is $\theta_{in}$ max, a minimum allowable value of the angle between the light beam emitted from the dark-field illumination and the observation direction of the microscope objective is $\theta_{in\_min}$, two constant coefficients are $a_1$ and $a_2$, and following conditions are satisfied:

$$\theta_{in} = a_1 \theta_{in\_max} + a_2 \theta_{in\_min}; \text{ and}$$

$$a_1 + a_2 = 1.$$

12. The microscopic observation method according to claim 1, wherein before the step of placing the specimen carrier at the observation point, the method further comprises:

placing the specimen carrier on two holders of a position movement element, such that the specimen carrier is clamped by the holders and fixed on the position movement element.

13. The microscopic observation method according to claim 1, wherein before the step of obtaining the length of the specimen carrier along the movement direction, the thickness of the specimen carrier along the observation direction of the microscope objective, the observation angle of the microscope objective, and the relative distance between the lateral surface of the specimen carrier and the microscope objective along the movement direction, the method further comprises:

aligning the microscope objective of required magnification with the specimen carrier, such that the specimen carrier is located within the observation area of the microscope objective.

14. The microscopic observation method according to claim 1, further comprising:

capturing a dark-field image of the specimen in the specimen carrier through the microscope objective.

15. The microscopic observation method according to claim 1, wherein after the step of placing the specimen carrier at the observation point, the method further comprises:

determining whether to perform a dark-field detection procedure;

when the dark-field detection procedure is determined to be performed, continuing to the step of obtaining the length of the specimen carrier along the movement direction, the thickness of the specimen carrier along the observation direction of the microscope objective, the observation angle of the microscope objective, and the relative distance between the lateral surface of the specimen carrier and the microscope objective along the movement direction; and when the dark-field detection procedure is determined to be not performed, capturing a bright-field image of the specimen through the microscope objective.

* * * * *